US011861676B2

(12) United States Patent
Sridhar et al.

(10) Patent No.: US 11,861,676 B2
(45) Date of Patent: Jan. 2, 2024

(54) AUTOMATIC ITEM GROUPING AND PERSONALIZED DEPARTMENT LAYOUT FOR REORDER RECOMMENDATIONS

(71) Applicant: Walmart Apollo, LLC, Bentonville, AR (US)

(72) Inventors: Rahul Sridhar, Santa Clara, CA (US); Sinduja Subramaniam, San Jose, CA (US); Evren Korpeoglu, San Jose, CA (US); Kannan Achan, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 322 days.

(21) Appl. No.: 17/163,388

(22) Filed: Jan. 30, 2021

(65) Prior Publication Data

US 2021/0241353 A1 Aug. 5, 2021

Related U.S. Application Data

(63) Continuation-in-part of application No. 16/779,254, filed on Jan. 31, 2020, now Pat. No. 11,636,525.

(51) Int. Cl.
*G06Q 30/00* (2023.01)
*G06Q 30/0601* (2023.01)

(52) U.S. Cl.
CPC ..... *G06Q 30/0631* (2013.01); *G06Q 30/0633* (2013.01)

(58) Field of Classification Search
CPC ..................................................... G06Q 30/00
See application file for complete search history.

(56) References Cited

U.S. PATENT DOCUMENTS

2001/0039519 A1 11/2001 Richards
2008/0313049 A1 12/2008 Lai et al.
2014/0310078 A1 10/2014 Andriyanenko et al.
2014/0372351 A1 12/2014 Sun et al.
(Continued)

FOREIGN PATENT DOCUMENTS

CN 108460619 8/2018

OTHER PUBLICATIONS

Instacart1, Hidayatuloh, Aep, “Instacart Market Basket Analysis”, rubs.com, dated Jun. 7, 2019. (Year: 2019).*
(Continued)

*Primary Examiner* — Mark A Fadok
(74) *Attorney, Agent, or Firm* — BRYAN CAVE LEIGHTON PAISNER LLP

(57) ABSTRACT

A system including one or more processors and one or more non-transitory computer-readable media storing computing instructions that, when executed on the one or more processors, perform certain acts. The acts can include obtaining reorder likelihood scores for items that a user has ordered historically. The acts also can include grouping the items into groups using a taxonomy. The acts additionally can include adjusting the groups based on a respective number of items in each of the groups and a respective group-specific threshold for each of the groups. The acts further can include ranking the items within the groups based on the reorder likelihood scores. Other embodiments are described.

20 Claims, 17 Drawing Sheets

1700

1705 -- Obtaining reorder likelihood scores for items ordered historically

1710 -- Grouping the items into groups using a taxonomy

1715 -- Adjusting the groups based a respective number of items in each of the groups and a respective group-specific threshold for each of the groups 1720 -- Ranking the items within the groups based on the reorder likelihood scores 1725 -- Determining, using an ensemble model, a respective number of items that the user is likely to reorder in each of the groups 1730 -- Ranking the groups based on the respective number of items the user is likely to reorder in each of the groups 1735 -- Transmitting for display to the user a user interface comprising the groups of the items

(56) References Cited

U.S. PATENT DOCUMENTS

2020/0402129 A1* 12/2020 Justin .................... G06Q 50/12
2022/0108374 A1 4/2022 Shuparsky

OTHER PUBLICATIONS

WooCommerce Docs, "Recommend Alternatives to Out-of-Stock Products," https://docs.woocommerce.com/document/product-recommendations/recommendation-strategies/recommend-alternatives-to-out-of-stock-products/, pp. 1-7, Accessed Jan. 4, 2021.
Russell, "Decision Tree Ensemble Methods," Aug. 15, 2017, https://medium.com/@mbrown/decision-tree-ensemble-methods-6a89181b7083, pp. 1-2.
Sami, MK et al. "Predicting Customers' Next Order", ijert.org, dated Jun. 2021. (Year: 2017) Jun. 2021.
Kalaiyarasu, Karthik, "Predicting user's next order by utilizing Machine learning algorithm and Market Basket Analysis", https://www.youtube.com/watch?v=B3Hjkd_34v8, dated Dec. 7, 2017. (Year: 2017) Dec. 7, 2017.
Dhanabal, Dravind, "Market Basket Analysis on Instacart", Oklahoma State University, dated Oct. 18, 2019. (Year: 2019) Oct. 18, 2019.

* cited by examiner

114
Hard Drive
116
Universal Serial Bus
112
CD-Rom Drive
220
208
Network Adapter
Memory ROM/RAM
204
Disk Controller
Graphics Adapter
224
214
System Bus
226
206
202
Video Controller
CPU
Keyboard Adapter
Mouse Adapter
Other I/O Devices
222
106
Monitor
210
Keyboard
Mouse
104
110

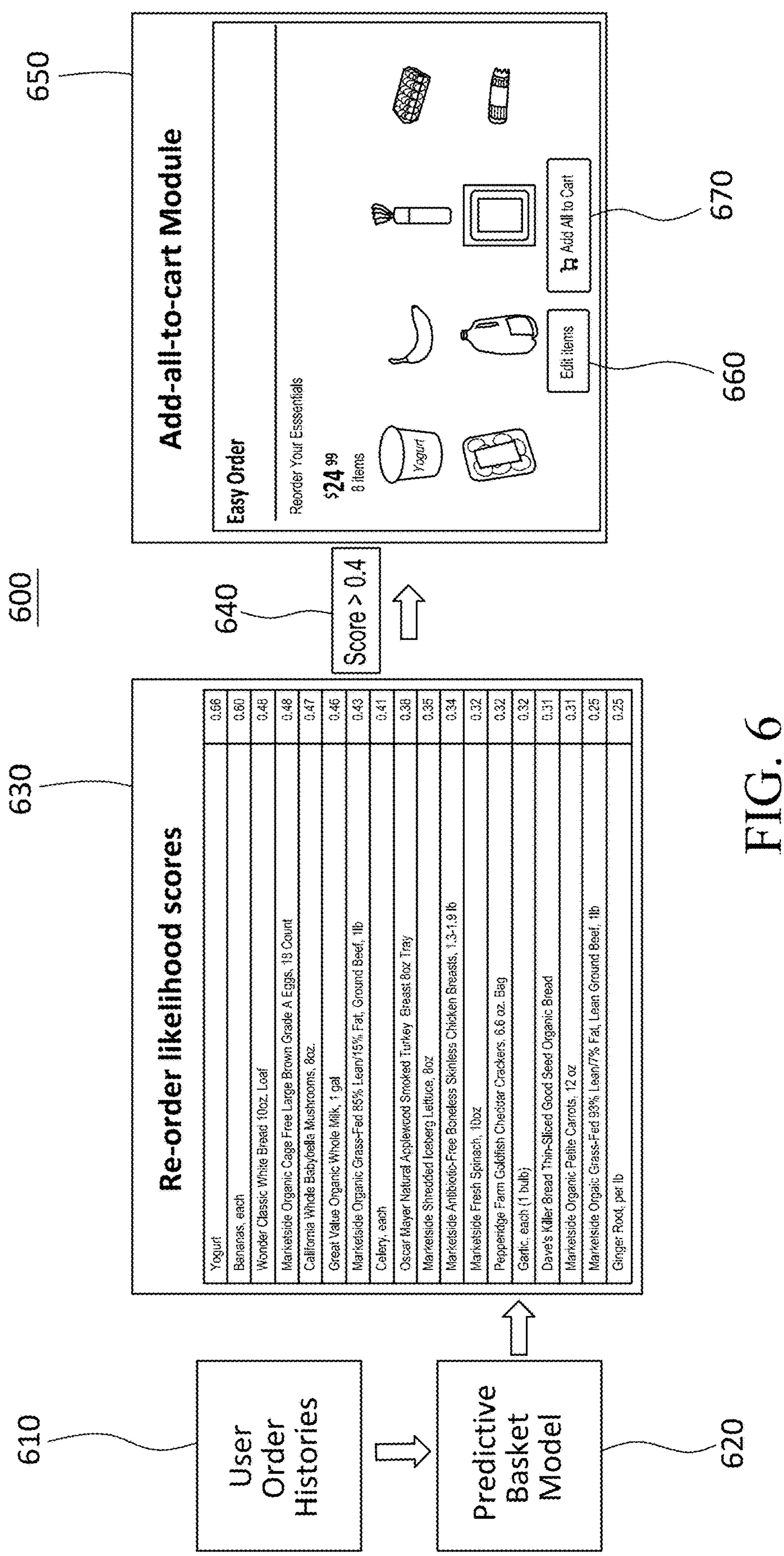

| | |
|---|---|
| Yogurt | 0.66 |
| Bananas, each | 0.60 |
| Wonder Classic White Bread 10oz. Loaf | 0.48 |
| Marketside Organic Cage Free Large Brown Grade A Eggs, 18 Count | 0.48 |
| California Whole Babybella Mushrooms, 8oz. | 0.47 |
| Great Value Organic Whole Milk, 1 gal | 0.46 |
| Marketside Organic Grass-Fed 85% Lean/15% Fat, Ground Beef, 1lb | 0.43 |
| Celery, each | 0.41 |
| Oscar Mayer Natural Applewood Smoked Turkey Breast 8oz Tray | 0.38 |
| Marketside Shredded Iceberg Lettuce, 8oz | 0.35 |
| Marketside Antibiotic-Free Boneless Skinless Chicken Breasts, 1.3-1.9 lb | 0.34 |
| Marketside Fresh Spinach, 10oz | 0.32 |
| Pepperidge Farm Goldfish Cheddar Crackers, 6.6 oz. Bag | 0.32 |
| Garlic, each (1 bulb) | 0.32 |
| Dave's Killer Bread Thin-Sliced Good Seed Organic Bread | 0.31 |
| Marketside Organic Petite Carrots, 12 oz | 0.31 |
| Marketside Orgaic Grass-Fed 93% Lean/7% Fat, Lean Ground Beef, 1lb | 0.25 |
| Ginger Root, per lb | 0.25 |

FIG. 6

1300
Set of features X
1301
1302

YES
NO
1303
1304
YES
NO
YES
NO
1305
1306
1307

AUTOMATIC ITEM GROUPING AND PERSONALIZED DEPARTMENT LAYOUT FOR REORDER RECOMMENDATIONS

CROSS-REFERENCE TO RELATED APPLICATIONS

This application is a continuation-in-part of U.S. patent application Ser. No. 16/779,254, filed Jan. 31, 2020. U.S. patent application Ser. No. 16/779,254 is incorporated herein by reference in its entirety.

TECHNICAL FIELD

This disclosure generally relates to item grouping and personalized department layout for reorder recommendations.

BACKGROUND

Online orders often include items that are frequently reordered. In many orders, more than half of the items are reordered items. Reordering such items generally involves browsing through multiple pages on a website to locate and add such items to an online order, which can be time-consuming. Additionally, users may forget some of the items that they would prefer to reorder.

BRIEF DESCRIPTION OF THE DRAWINGS

To facilitate further description of the embodiments, the following drawings are provided in which:

FIG. 6 illustrates a flow chart for a method, according to another embodiment;

Figure 1:
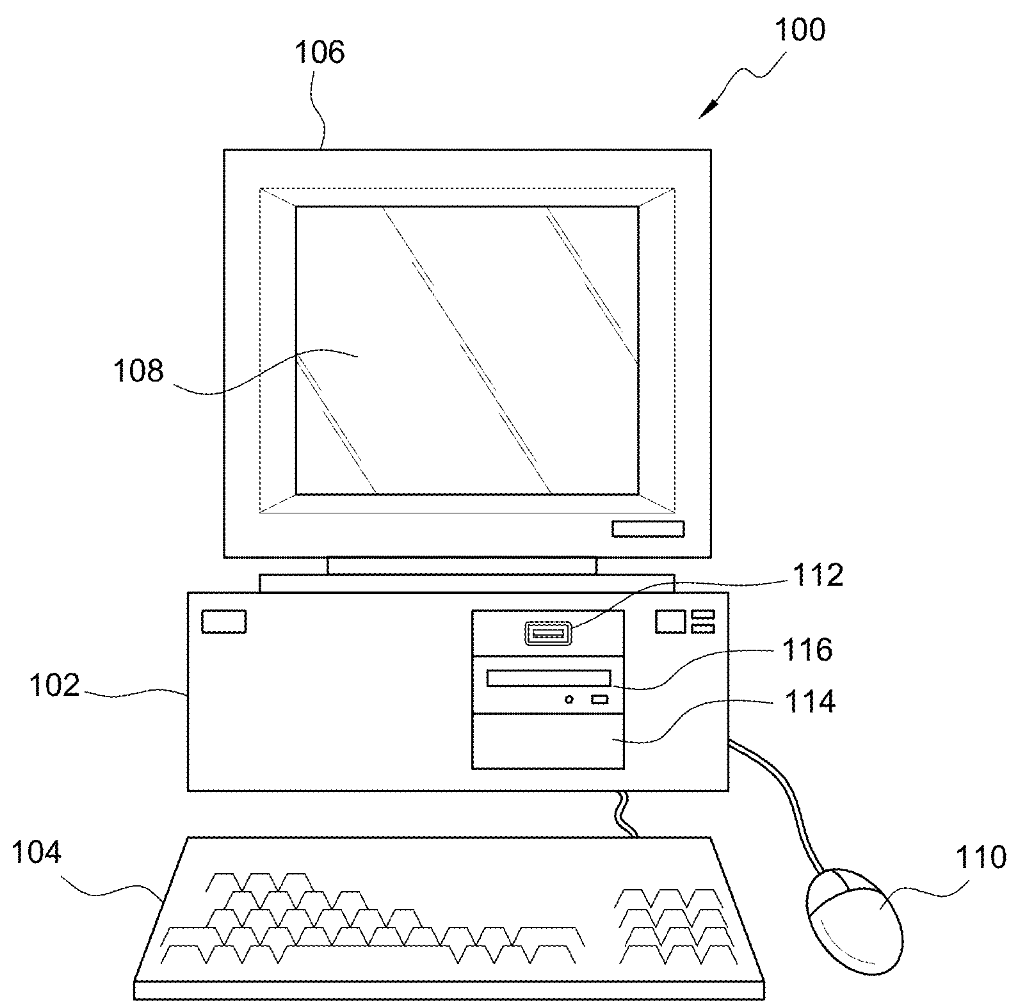
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, or ten seconds.

DESCRIPTION OF EXAMPLES OF EMBODIMENTS

Figure 2:
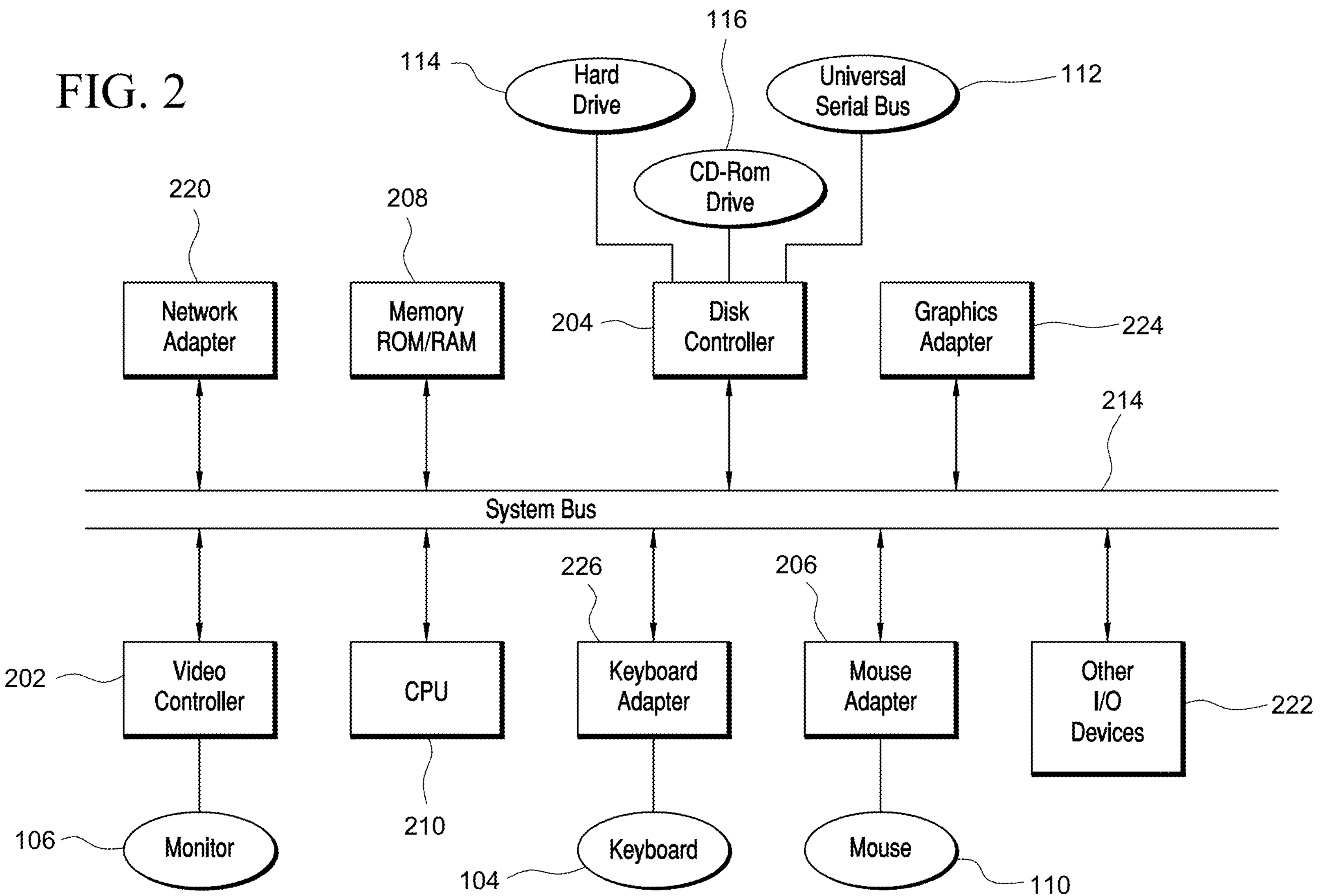
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
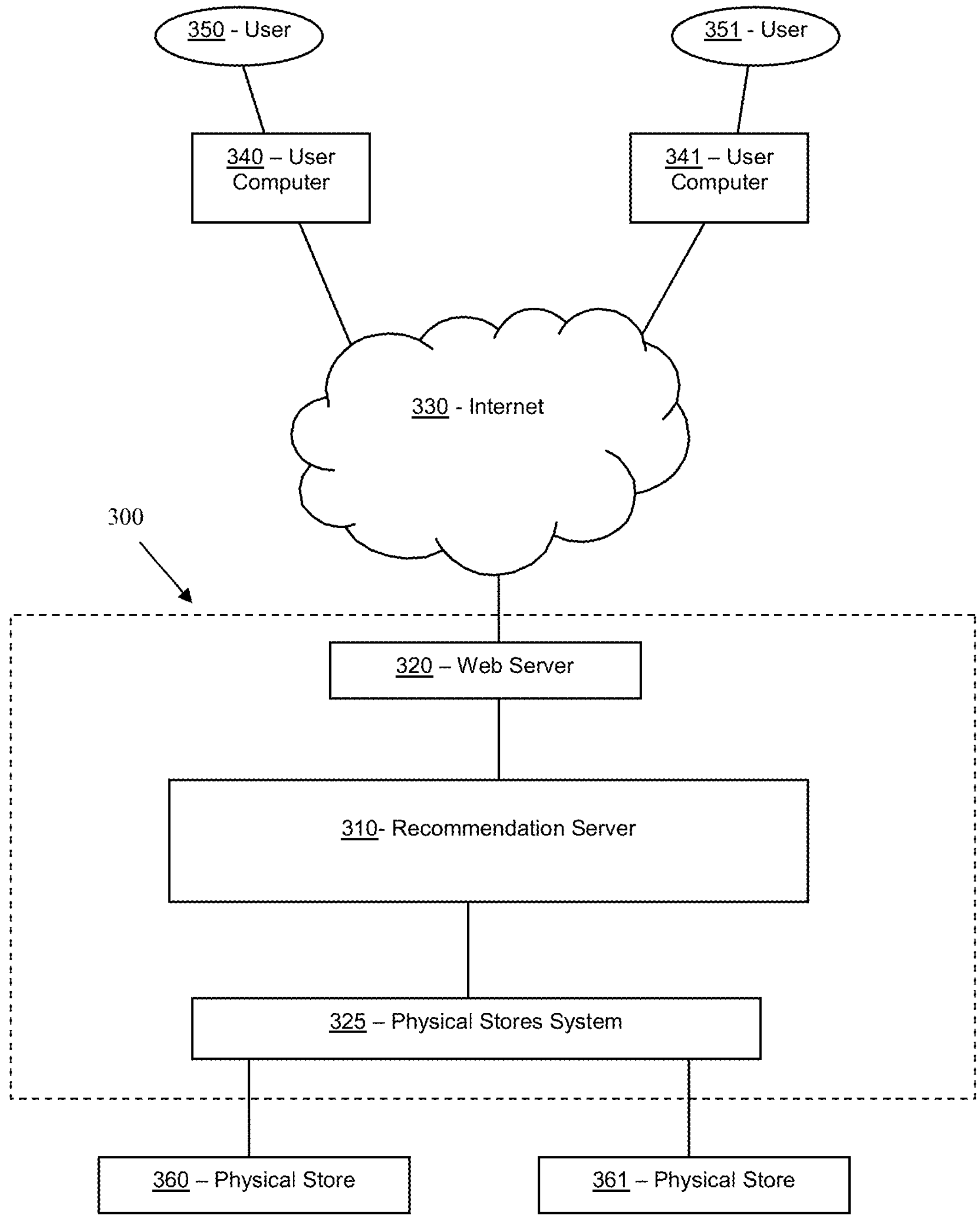
FIG. 3 illustrates a block diagram of a system that can be employed for a single-select predictive platform model, according to an embodiment.

Turning ahead in the drawings, FIG. 3 illustrates a block diagram of a system 300 that can be employed for a single-select predictive platform model, according to an embodiment. In many embodiments, the single-select predictive platform model can involve determining and presenting a set of items (e.g., frequently reordered items) to a user interface (e.g., graphical user interface) of a user. In many embodiments, a single-select option (e.g., add-all-to-cart option) on a user interface can add all of the items in the set of items to a cart of the user, as described below in further detail. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a recommendation server 310, a web server 320, and/or a physical stores system 325. Recommendation server 310, web server 320, and/or physical stores system 325 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of, recommendation server 310, web server 320, and/or physical stores system 325. Additional details regarding recommendation server 310, web server 320, and/or physical stores system 325 are described herein.

In a number of embodiments, each of recommendation server 310, web server 320, and/or physical stores system 325 can be a special-purpose computer programed specifically to perform specific functions not associated with a general-purpose computer, as described in greater detail below.

In some embodiments, web server 320 can be in data communication through Internet 330 with one or more user computers, such as user computers 340 and/or 341. Internet 330 can be a public or private network. In some embodiments, user computers 340-341 can be used by users, such as users 350 and 351, which also can be referred to as customers, in which case, user computers 340 and 341 can be referred to as customer computers. In many embodiments, web server 320 can host one or more sites (e.g., websites) that allow users to browse and/or search for items (e.g., products), to add items to an electronic shopping cart, and/or to order (e.g., purchase) items, in addition to other suitable activities.

In several embodiments, physical stores system 325 can be in data communication with the point-of-sale systems in physical stores, such as physical store 360 and/or physical store 361. In many embodiments, physical stores 360-361 each can be a physical store, such as a brick-and-mortar store, that is associated (e.g., operated by a common business entity or entities under common control) with the website hosted by web server 320. In many embodiments, many of the items sold at the physical stores (e.g., 360-361) can be the same as the items sold on the website. In some embodiments, physical stores system 325 can be a distributed system that includes one or more systems in each of the physical stores (e.g., 360-361). In other embodiments, physical stores system 325 can be a centralized system that communicates with systems in the physical stores (e.g., 360-361). In several embodiments, physical stores system 325 can track orders made by users (e.g., 350-351) in the physical stores (e.g., 360-361).

In some embodiments, an internal network that is not open to the public can be used for communications between recommendation server 310, web server 320, and/or physical stores system 325 within system 300. Accordingly, in some embodiments, recommendation server 310 and/or physical stores system 325 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, recommendation server 310, web server 320, and/or physical stores system 325 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to recommendation server 310, web server 320, and/or physical stores system 325, in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of recommendation server 310, web server 320, and/or physical stores system 325. In a similar manner, the processors and/or the non-transitory computer-readable media can be local and/or remote to each other.

Meanwhile, in many embodiments, recommendation server 310, web server 320, and/or physical stores system 325 also can be configured to communicate with and/or include one or more databases and/or other suitable databases. The one or more databases can include a product database that contains information about products, items, or SKUs (stock keeping units), for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit, or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between recommendation server 310, web server 320, and/or physical stores system 325, and/or the one or more databases, can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In some embodiments, recommendation server 310 can be a general-purpose computer or a special-purpose computer programmed to perform specific functions and/or applications. For example, recommendation server 310 can perform one or more machine learned predictive basket models to determine a set of items to recommend to a user (e.g., 350-351) with a high level of confidence that the user will select all of the items in the set of items. In some embodiments, recommendation server 310 can perform modifying and/or updating a probability of reordering each of the items previously ordered by the user. In several embodiments, the probability of reordering a set of items, based on one or more machine learned predictive basket models, can be for a specific period of time. In many embodiments, the probability of reordering a set of items can depend on whether each item of the set of items exceeds a predetermined threshold and/or a predetermined reorder likelihood score before the item can be included in the set of items for a particular time period. In various embodiments, the set of items to recommend to a user (e.g., 350-351) for a period of time can be modified and/or updated each time the user visits the page (e.g., webpage) and/or automatically updated during another suitable period of time.

In some embodiments, a single-select predictive platform model (also called a predictive basket model) can be capable of determining a certain number of items a user is most likely to reorder. A set of items can be displayed on a user interface and by engaging a single-select option (e.g., single-click option), a user can add the entire set of items to an online basket. The single-select (e.g., single-click) option can be implemented using a predictive platform model.

Figure 4:
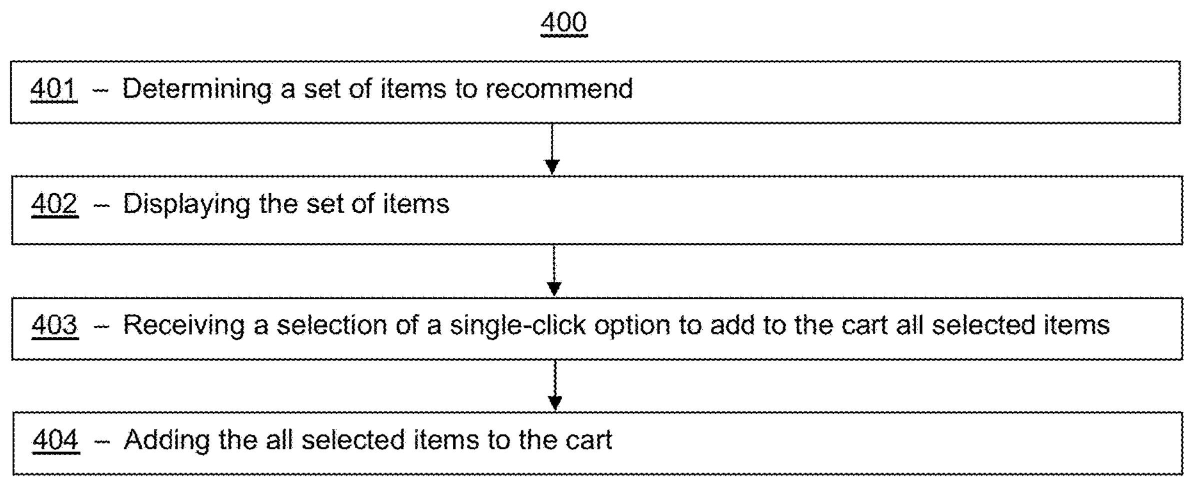
FIG. 4 illustrates a flow chart for a method, according to another embodiment.

Turning ahead in the drawings, FIG. 4 illustrates a flow chart for a method 400, according to another embodiment. In some embodiments, method 400 can be a method of automatically presenting a set of items to display on a user interface of device of a user (e.g., 350-351 (FIG. 3)). In several embodiments, the set of items can be generated by determining a probability that the user will select all of the items in the particular set of items to a cart, such as on a given time on a given day. In many embodiments, the user can use an interactive single-select option displayed on the user interface of a user computer (e.g., 340-341 (FIG. 3)). Method 400 is merely exemplary and is not limited to the embodiments presented herein. Method 400 can be employed in many different embodiments and/or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as recommendation server 310, web server 320, and/or physical stores system 325. The processor(s) can be similar or identical to the processor(s) described above with respect to computer system 100 (FIG. 1).

Referring to FIG. 4, method 400 can include a block 401 of determining a set of items to recommend to a user based on a probability exceeding a predetermined threshold that the user will reorder each item of the set of items at a present time. In a number of embodiments, the probability can be determined based at least in part on previous transactions of the user and other users. In several embodiments, the set of items can include at least a predetermined number of items. In some embodiments, a probability that the user will reorder each item of the set of items can be determined for a period of time between visits by a user (one day, two days, one week, two weeks, one month, and/or another suitable length of time). In many embodiments, the set of items can include a predetermined minimum and/or maximum number of items. In some embodiments, a number of items in the set of items can vary depending on a number of items that exceed a threshold score and/or depending on the size of a screen of the user computer. In several embodiments, the set of items can include regularly ordered and/or replenishable items that were periodically ordered over a period of time. In many embodiments, regularly ordered items (e.g., items frequently ordered) can include the same one or more items and/or one or more brands of the items that were ordered more than a predetermined number of times over a period of time. For example, replenishable items can include items that a user repeatedly ordered within an interval of time to replenish the items for consumption, such as, certain groceries, toiletries, items with expiration dates, and other such types of consumables.

In several embodiments, the probability can be determined based at least in part on previous transactions of the user and other users within a first period of time, such as, thirteen (13) months from a date of a previous transaction, or another suitable period of time. In some embodiments, the first period of time can range from a month of a year to a subsequent month of the year, and/or the same month of a subsequent calendar year and/or any suitable range of time. In several embodiments, a probability that the user will reorder each item of the set of items can include predicting a likelihood (e.g., likelihood score) of the user reordering the entire set of items as displayed to the user during a current visit to a page (e.g., webpage) and/or within a number of weeks subsequent to the last visit to the page and/or other suitable periods of time.

In some embodiments, block 401 of determining a set of items to recommend to a user based on a probability exceeding a predetermined threshold that the user will reorder each item of the set of items at a present time can include determining the set of items as a subset of multiple items within the previous transactions of the user based on the probability that the user will reorder the each item of the set of items at the present time exceeding the predetermined threshold. In various embodiments, the probability for the items can be learned from historical orders made by the user. In several embodiments, the historical transactions of the user and/or other users can be used to identify specific items consumed by a user over a period of time each time an item was reordered (e.g., groceries, perishable products, expired products, and/or other suitable frequently replenishable essentials). In many embodiments, the set of items can be displayed on a user interface and can include all of the items displayed on a single page (e.g., a single webpage). In several embodiments, a user interface can include an interactive selection option to permit and/or prompt the user to select all of the set of items to be added to a cart upon activating the interface of such a page.

In several embodiments, the previous transactions can include online transactions and in-store transactions made by the user and other users within a period of time occurring before the present time. In many embodiments, the previous transactions can be stored in a database along with the times/dates of the orders of the online transactions and/or the in-store transactions. In some embodiments, a set of previous transactions of the user and/or other users can include online transactions and in-store transactions transacted within a set period of time. In many embodiments, the online transactions and the in-store transactions can be accumulated and/or saved within a database based on a period of time. In several embodiments, the set of items stored can be periodically updated to display relevant and/or current favorite items personal to the user. In various embodiments, the data accumulated and stored within the database can be used for current training data for machine learning approaches and/or determining a probability identifying the items to be ordered on specific times on specific days. For example, after each transaction on a given time of day, the set of items for each user can be automatically updated to add the transaction information to a database.

In some embodiments, the probability of determining a set of items to recommend to a user can be determined based on at least one or more machine learning models and/or other suitable machine learning approaches, as described below in further detail.

Generally, one or more machine learning models can be used to predict a probability and/or a likelihood that a user will reorder the set of items at a present time. In some embodiments, one or more machine learning models can determine a probability for each item ordered by the user within a period of time. In several embodiments, one or more machine learning models can determine a reorder likelihood score attributed to each item as ordered during a period of time. In many embodiments, the set of items can be ranked by the reorder likelihood scores based on a range of a predetermined number of items. In several embodiments, the set of items can be re-ranked by a top "k" number of items with the reorder likelihood scores that exceed a predetermined threshold reorder likelihood score (e.g., 0.4, 0.5, or another such suitable threshold number between 0 and 1 based on score threshold evaluation). In many embodiments, the data used for one or more machine learning models can be updated frequently and/or automatically updated on a periodic time schedule that will be described below in further detail.

In a number of embodiments, determining particular patterns of user behavior can be predicted by using a machine learning model and/or any other suitable machine learning approaches, such as patterns of behavior associated with a user regularly ordering certain items and/or brands of items. In some embodiments, a range of signals and/or interaction data can include different levels that can include a user, an item, user-item interactions, transactions, and other suitable levels of signals and/or interactions.

In many embodiments, a range of signals and/or interaction data can include data associated with an average basket-level spend (e.g., an average amount of money spent for each basket in an order) and/or an average basket size by a user over a period of time. In a number of embodiments, a range of signals and/or interaction data can include data indicating one or more patterns of shopping diversity across one or more categories, brands, and/or basket compositions based on an N number of previous transactions. In some embodiments, a range of signals and/or interaction data can include data indicating an average frequency and/or an average rate at which an item is replenished. In many embodiments, an average frequency and/or an average rate can include an item inter-order interval.

Further, in some embodiments, a range of signals and/or interaction data can include data of a user-specific reorder frequency of an item. In many embodiments, a range of signals and/or interaction data can include data based on tracking a number of days that have lapsed since a last order of an item by the user and/or other users. In several embodiments, a range of signals and/or interaction data can include user feedback as interaction-level data that can include transactions (e.g., purchases, exchanges) of items that can be similar to an originally ordered item, rejecting a recommended substitute, returns of recommended items and/or returns of recommended substitutes when an item is out of stock.

Additionally, in a number of embodiments, the range of signals can include order status handling signals, such as whether orders for the customer include items that are amended, canceled, returned, substituted, or out of stock without reasonable alternatives.

In many embodiments, a logistic regression model can output a reorder likelihood score, such as a score between 0 and 1, for each item of the set of items. In a number of embodiments, the set of items can include a number of items based on a predetermined threshold number, such as a number between 0 and 1. For example, a predetermined threshold number for a set of items can be greater than 0.4 (e.g., >=0.4), such that at least a portion and/or all of the reorder likelihood scores equal to or above 0.4 can be added to the set of items. FIG. 6, which is described below, illustrates an example of determining the number of items that make up the set of items by using a predetermined threshold, as described below in further detail.

In several embodiments, based on a predetermined threshold number, the number of items in a set of items can be different. For example, the number of items greater than the predetermined threshold can result in eight (8) items for a current visit and can be twenty-four (24) items on a subsequent visit. As another example, during a current visit to a page, the user can be presented with a number of items of the set of items, such as sixteen (16) items, and during a subsequent visit to the page, such as within a two week period after the current visit, the user can be presented with another number of items that can include another set of items, such as twenty-four (24) items. Additionally, in some embodiments, a set of items can include a set of different items and/or a set of the same items from previous visits. For example, the user can be presented with the same number of items on each visit that can include the same items from the previous visit and/or different items. In some embodiments, the set of items can be divided for display on at least one or more pages to adapt to one or more different screen sizes of a device of a user, as described below in further detail.

In many embodiments, the one or more machine learning models can include at least a logistic regression model, a decision tree model, a recurrent neural network model, and/or a multi-level learning model, as described below in further detail. In some embodiments, the output of the machine learning model can be used as a basis to determine probabilities items are likely to be reordered at the present time and/or at a particular time and/or day when the user will interact with the page.

In various embodiments, block 401 of determining a set of items to recommend to a user based on a probability exceeding a predetermined threshold that the user will reorder each item of the set of items at a present time can include determining the set of items using a logistic regression model to predict the probability based on the previous transactions. In a number of embodiments, determining the set of items using logistic regression model to predict the probability can be based on at least the range of signals and/or the interaction data. In many embodiments, a logistic regression model can include a statistical modeling algorithm used to model the probability of an event with binary outcomes. In many embodiments, the binary outcomes can be 0 (e.g., not ordered) or 1 (e.g., ordered).

In some embodiments, a logistic regression model can include a statistical model that outputs a probability of the user reordering an item during a current visit to a page and/or within a predetermined period of time. For example, the period of time for the next visit can include the next day, the next two weeks, or another suitable period of time when the user visits the page. In several embodiments, the one or more machine learning models can include an output (e.g., predictions, result of the model) to be a value between 0 and 1. In a number of embodiments, a logistic regression model can include the following formula:

$$\text{probability(purchase)} = \frac{1}{1 + \exp\left(-\left(W * X^T\right)\right)} \tag{1}$$

where X is a list of features, W is a list of weights learned by the logistic regression model for each feature, and T represents the vector/matrix transpose operation.

In many embodiments, the list of features represented by variable X in formula (1) can include an item inter-order interval of a user, a basket size, a period of time since the last order, a list of other features, and/or any other suitable features. In some embodiments, a list of weights learned by the logistic regression model for each feature can include weights of a number of orders, weights of the item inter-order interval, weights of a basket size, weights of a period of time since the last order, and/or any other suitable weights of any other features.

In some embodiments, the logistic regression model can be trained on training data received, and/or training data refreshed during a second period of time. In several embodiments, the training data can include features generated by order history of the user and the other users within a second period of time. The logistic regression model can learn through an iterative process using the training data, as refreshed. In many embodiments, a performance of the logistic regression model is evaluated against a set of periodic frequencies of the online transactions and the in-store transactions for each item of the set of items to predict a confidence level of the probability. In a number of embodiments, training a logistic regression model to create a trained model using first data (e.g., training data) can provide a probability of a user of the users selecting a previously ordered item to reorder during a second period of time. In several embodiments, the training data can include input data of at least features (e.g., predictor variables) generated by previous transactions of the user and other users.

In several embodiments, one or more machine learning models can learn about preferred items, preferred order quantities, a preferred order cadence pattern, preferred item variants and/or substitutes of the user and other users.

In several embodiments, the logistic regression model can learn to predict a high level of probability (e.g., high-level of confidence) for each item ordered by a user during a predetermined period of time based on training data over a period of time. For example, the logistic regression model can be designed to predict with a high level of confidence that the user will select each of the items in the set of items during a visit to a page during a time period without deselecting any of the items.

In many embodiments, the logistic regression model can include training data to create a model that can predict the probability of reordering an item on a given date. In some embodiments, the training data can include feature data based on a number of transactions of a user and/or other users over a predetermined period of time. For example, metrics for training data can include generating many months, such as thirteen (13) months, of transaction data and/or order history data obtained for millions of users. In many embodiments, feature data that can be utilized for training data can include user features, item features, user-item interaction features, and/or any other features suitable to the training, as described above. In many embodiments, training data can be evaluated based on transactions of the user and/or other users that occurred during a period of time after the training period, such as a two week interval that occurs after the end of the training period or another suitable time interval. In some embodiments, the logistic regression model generated by the training data can be evaluated against one or more frequency-based and/or recency-based baseline metrics to measure a precision and/or recall of the model.

In a number of embodiments, the logistic regression model can learn from multiple iterations of training data within a period of time. In many embodiments, the logistic regression model can be used on each transaction completed for the user to generate a reorder likelihood score between 0 and 1 for each item. In several embodiments, the reorder likelihood score for each item can be stored in a database, a memory, and/or a cache memory to be accessed to build the set of items, where the items with a current reorder likelihood score that exceeds the reorder likelihood threshold can be added to the set of items for the next visit to the page by the user, and items with a current reorder likelihood score that does not exceed the reorder likelihood threshold can be excluded from the set of items. For example, a predetermined reorder likelihood threshold can include all items with likelihood scores greater than 0.4. In some embodiments, all the items with scores greater than 0.4 can be displayed on the user interface, subject to any predetermined limit of items to be displayed on the user interface. In several embodiments, a set of items can include the items that exceed the predetermined reorder likelihood threshold, limited to a predetermined limit of items. In some embodiments, the reorder likelihood score for each item can vary at different times. For example, an item with a reorder likelihood threshold below 0.4 during one visit can have a new reorder likelihood threshold of 0.4 and/or above on a different visit to the page.

In many embodiments, the logistic regression model can be periodically trained with additional learning based on another set of iterations from a new set of training data based on at least other features and/or a new period of time.

In several embodiments, block 401 of determining a set of items to recommend to a user based on a probability exceeding a predetermined threshold that the user will reorder each item of the set of items at a present time can include determining the set of items using a decision tree model to predict the probability by calculating a value of at least a target variable using random forests and gradient boosted trees.

Similar to logistic regression, decision tree-based techniques are a class of machine learning algorithms that can be used in various embodiments for use-cases such as this one. Random forests and gradient boosted trees are extensions of the decision tree model, which can work by using a set of features to make incremental decisions towards predicting whether a customer will reorder a particular item.

Figure 13:
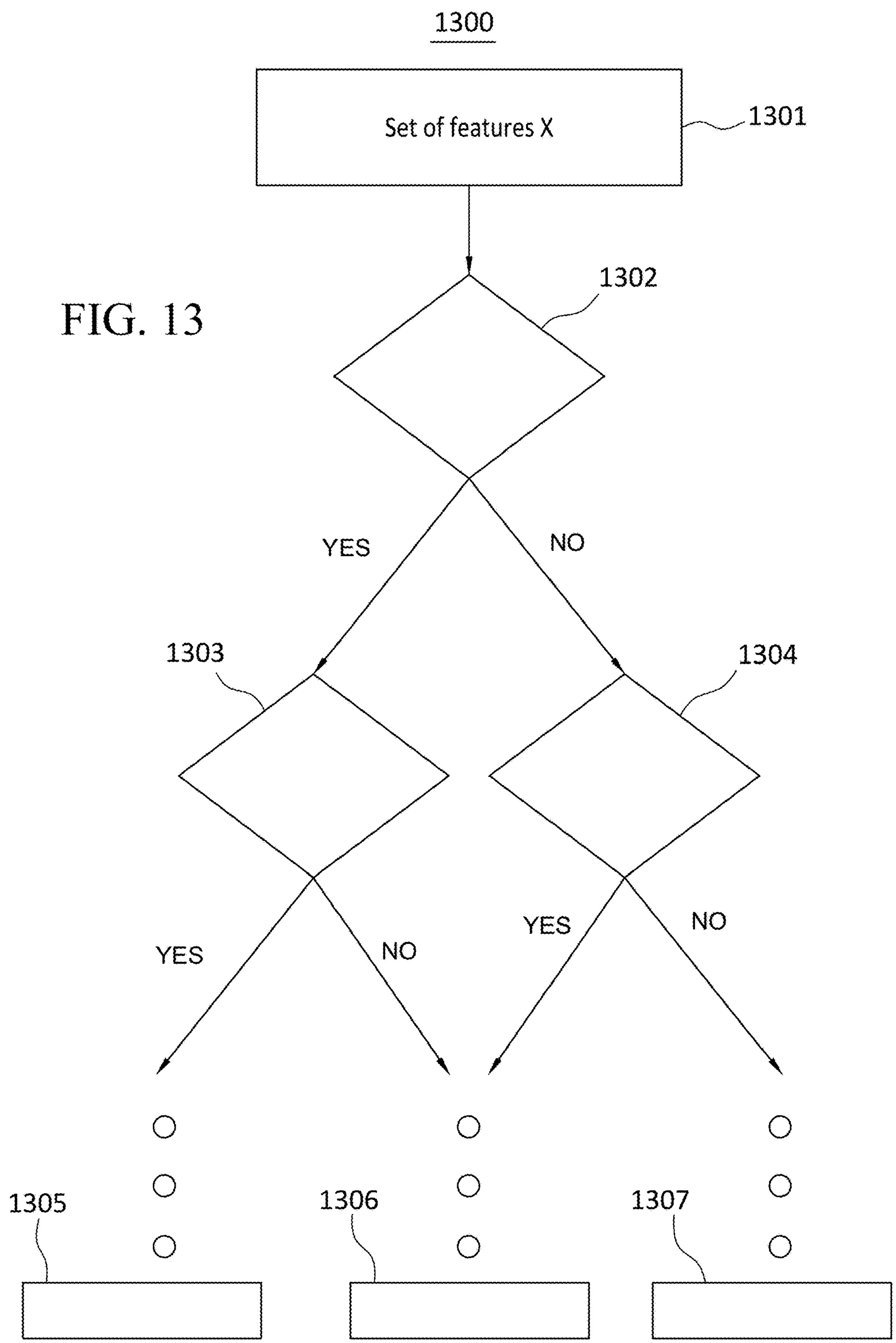
FIG. 13 illustrates a flow chart for a method of using a decision tree.

Jumping ahead in the drawings, FIG. 13 illustrates a flow chart for a method 1300 of using a decision tree. Method 1300 can begin with a block 1301 of a set of features, denoted as X. Method 1300 can continue with a decision point 1302. At each decision point of the tree, one feature of the set of features can be selected to split the input training data into different branches of the tree. For example, if the output of decision point 1302 is YES, method 1300 can continue after decision point 1302 with a decision point 1303, and if the output of decision point 1302 is NO, method 1300 can continue after decision point 1302 with a decision point 1304. Similarly, at decision points 1303 and/or 1304, the output can be YES or NO, which can split the input training data further, which can continue at additional decision points (not shown) as the tree is traversed. After traversing further down the tree, training data with similar features are more likely to be in the same tree node, and eventually, each path from the root of the tree to the leaf nodes at the bottom of the tree leads to a predictive decision point with regards to whether a customer will reorder a particular item or not. For example, the leaf nodes can include nodes 1305-1307. At each decision point in the tree, the model can learn a feature (e.g., an optimal feature) to be used to split the tree, and the corresponding value for each feature. The feature that is used to split the tree further can be selected by attempting to maximize the information gain that would be obtained by using that particular feature to split the tree. More specifically, information gain can be computed as a function of the entropy of the data before and after the feature is used to split the data, as follows:

$$\text{Entrophy} = \sum_{k} -p_k \log p_k$$

where 'k' corresponds to the number of classes to be predicted in the data, which in this case would be "customer will reorder" vs. "customer will not reorder"; 'p' corresponds to the probability of observing that class in the data.

As an example, decision point 1302 can consider a first feature $X_1$ corresponding to a number of orders in the set of features X, and can determine whether the number of orders is greater than 10. When first feature $X_1$ satisfies this condition, traversal of the decision tree proceeds to decision point 1303, and if not, traversal of the decision tree proceeds to decision point 1304. Decision point 1303 can consider a second feature $X_2$ corresponding to the number of lapsed days in the set of features X, and can determine whether the number of lapsed days is fewer than 5. When second feature $X_2$ satisfies this condition, traversal of the decision tree can proceed to an additional decision point (not shown), and if not, traversal of the decision tree can proceed to a different additional decision point (not shown). Decision point 1304 can consider a second feature $X_2$ corresponding to the number of lapsed days in the set of features X, and can determine whether the number of lapsed days is fewer than 10. When second feature $X_2$ satisfies this condition, traversal of the decision tree can proceed to an additional decision point (not shown), and if not, traversal of the decision tree can proceed to a different additional decision point (not shown). Traversal of the decision tree can proceed to leaf nodes, such as leaf nodes 1305-1307, which can indicate whether the customer will reorder, such as in leaf node 1305, or that the customer will not reorder, such as in leaf nodes 1306-1307.

Random forests can build upon this decision tree model shown in FIG. 13 by combining multiple trees to make a prediction, by making use of randomization to sample the original training data, and/or by selecting a subset of features at each decision point in the tree. Gradient boosted trees also can combine multiple trees to make a prediction, and can use an iterative approach to incrementally make the predictive capabilities of the model stronger by focusing on incorrect predictions from previous iterations of the model.

Returning in the drawings to FIG. 4, in many embodiments, block 401 of determining a set of items to recommend to a user based on a probability exceeding a predetermined threshold that the user will reorder each item of the set of items at a present time can include determining the set of items using a recurrent neural network model to predict the probability by utilizing model temporal sequences of data comprising (i) previous transactions of the user and the other users and (ii) cart compositions of the user and other users.

Neural networks can be a more complex form of machine learning, and they can have an empirical superiority over traditional machine learning algorithms, particularly when there is an abundance of data. Recurrent neural networks are a type of neural networks that can be used to model temporal sequences of data, such as in this use case, wherein a sequence of historical transactions of a particular item can be used to predict whether that item will be reordered by a customer. The output predicted at each time step of the sequence can be a non-linear function of the features at that time step and the outputs from the previous time step. Neural networks can include multiple layers of such non-linear transformations stacked on top of each other, which can provide the ability to model complex patterns in the data, and consequently make more accurate predictions, at the expense of added complexity of learning parameters for multiple layers.

In addition to feeding in historical sequences of transactions and features, the model can also incorporate entire basket compositions from previous transactions of a user, which can be used to potentially identify latent correlations and interactions across different items that the user has ordered (e.g., purchased).

In a number of embodiments, block 401 of determining a set of items to recommend to a user based on a probability exceeding a predetermined threshold that the user will reorder each item of the set of items at a present time can include determining the set of items using a multi-level learning model to predict the probability by analyzing: a first model of user behavior to predict a category the user is likely to visit on the page; and (ii) a second model to predict a likelihood that the user will reorder an item from the category.

In many embodiments, the multi-level model approach can aim to capture the affinity of the user towards certain categories for reordering. For example, if a user reorders Fat-free Milk more frequently than Soy Milk, this behavior can be utilized to train a multi-level model. The model can have two levels of prediction and each level can use any of the previously defined machine learning algorithms, such as logistic regression, random forest, gradient boosted trees, and/or neural networks, individually or as an ensemble. The first level of the model can predict the probability of the user reordering from a category that the user has bought from previously. Using the first level category reorder probability, the second level of the model can predict the likelihood of the user reordering an item from the selected category.

Figure 8:
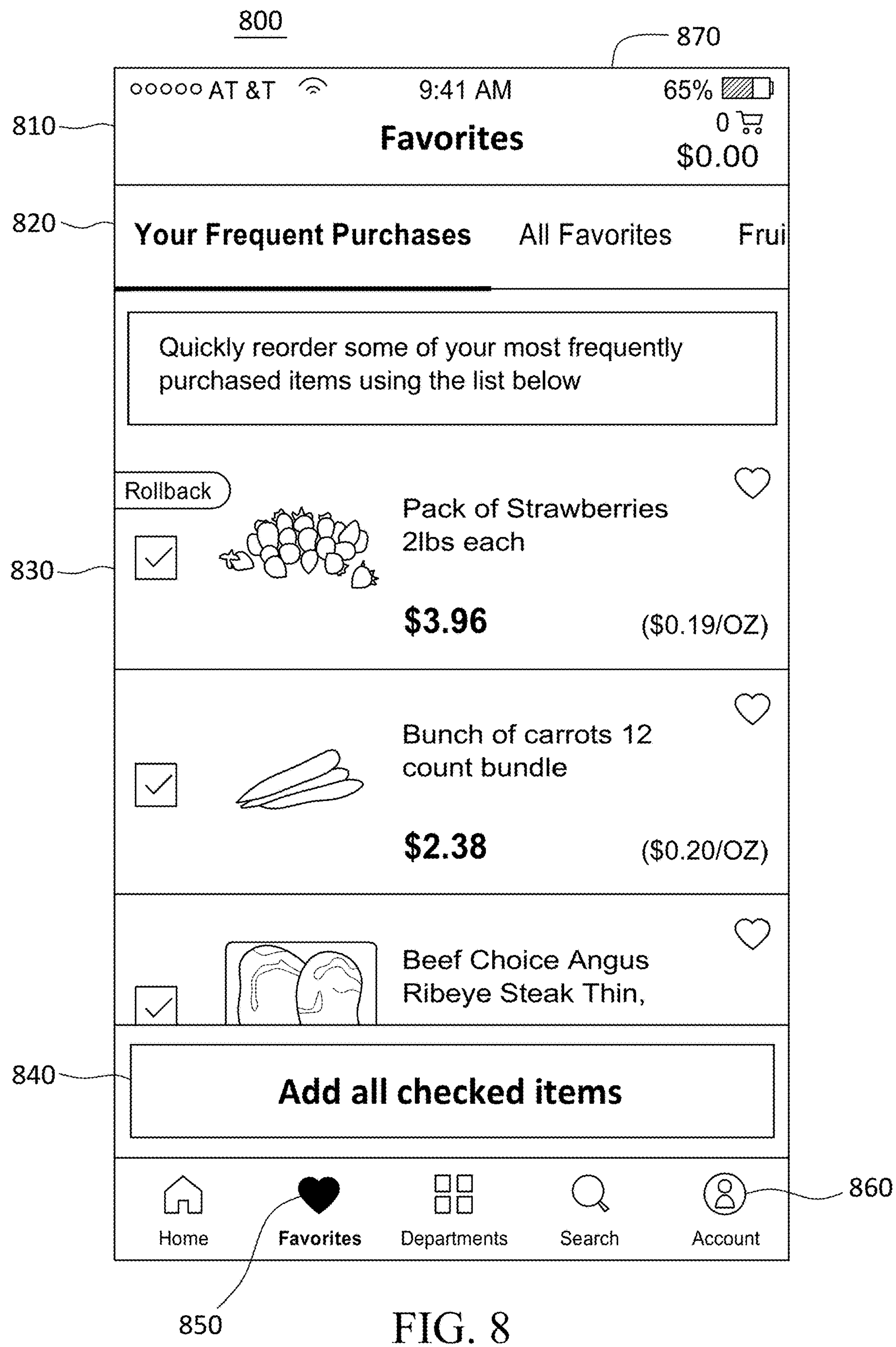
FIG. 8 illustrates an exemplary user interface display showing a favorites page.

As an example, in the past a user has bought Silk Soy Milk, Almond Breeze Soy Milk, Great Value Fat Free Milk, Horizon Fat Free Milk, and Great Value Whole Milk. In the next transaction of the user, the model can predict which brand of milk the user is likely to reorder, and can use this prediction to re-rank and display items on a favorites page for the user. The favorites page can be similar or identical to user interface display 800 (FIG. 8, described below). At a first level of the multi-level model, a probability of reordering Soy Milk can be determined to be 0.1, a probability of reordering Fat Free Milk can be determined to be 0.7, and a probability of reordering Whole Milk can be determined to be 0.6. In many embodiments, a threshold can be used to filter out low probabilities. For example, a threshold of 0.5 can be used, such that Fat Free Milk and Whole Milk can be chosen in the first level. At a second level of the multi-level model, the probability of reordering among different kinds (e.g., brands) of Fat Free Milk and Whole Milk can be determined, based on the kinds the user has ordered in the past. For example, a probability of reordering Great Value Fat Free Milk can be 0.8, a probability of reordering Horizon Fat Free Milk can be 0.3, and a probability of reordering Great Value Whole Milk can be 0.6. In many embodiments, a threshold can be used to filter out low probabilities. For example, a threshold of 0.5 can be used, such that Great Value Fat Free Milk and Great Value Whole Milk can be selected to be displayed to the user on the favorites page.

In some embodiments, the model can be extended to have more levels of prediction, such as making predictions from higher levels of categories to more granular categories, to eventually make predictions on individual items. For example, a first prediction can be on a higher level category to predict Dairy, then a second prediction can be for a more granular category of Milk, and a third prediction can be for an even more granular category of Fat Free Milk, and a fourth prediction can be for the individual item of Great Value Fat Free Milk.

Figure 10:
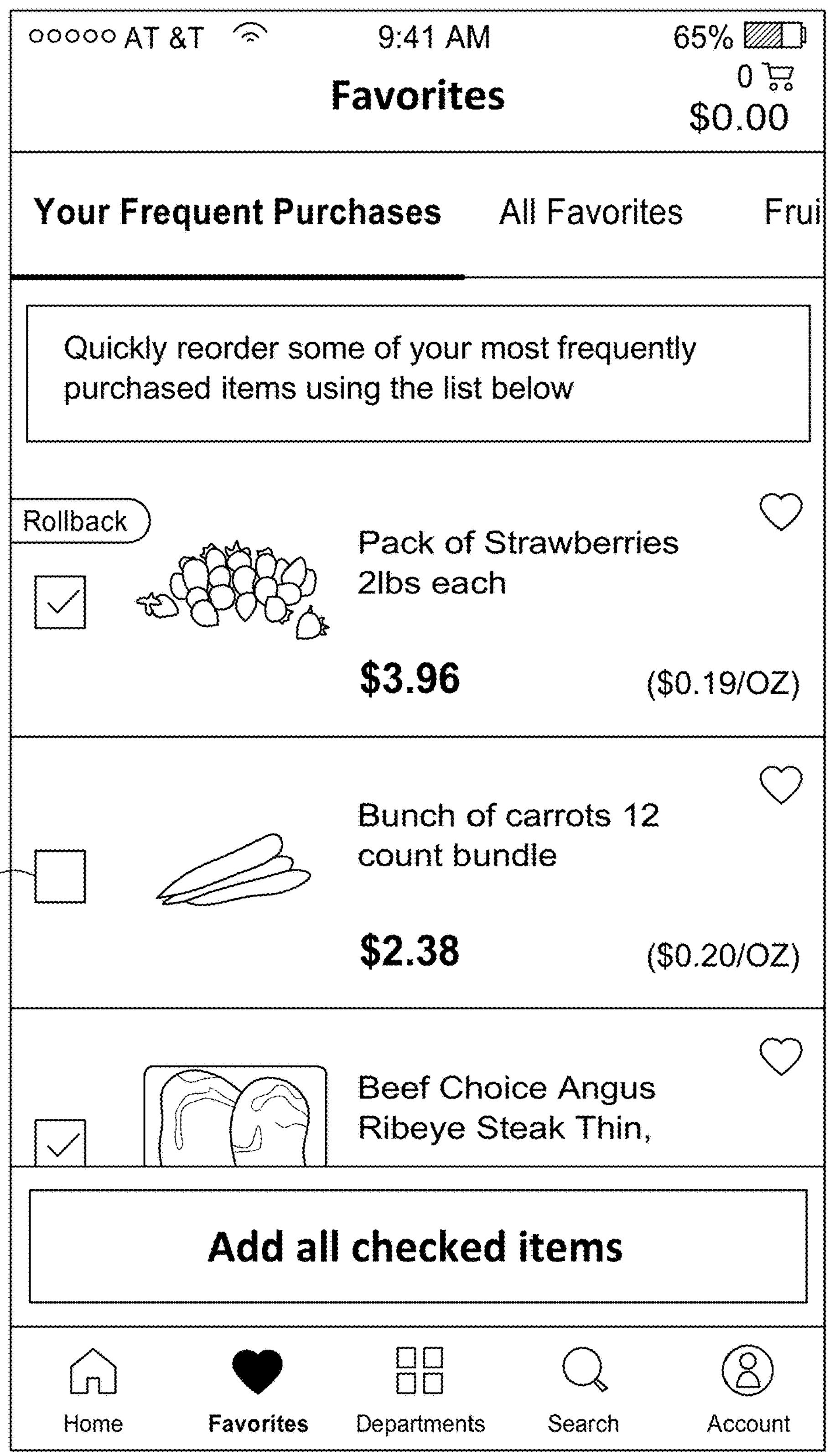
FIG. 10 illustrates an exemplary user interface display.
Figure 12:
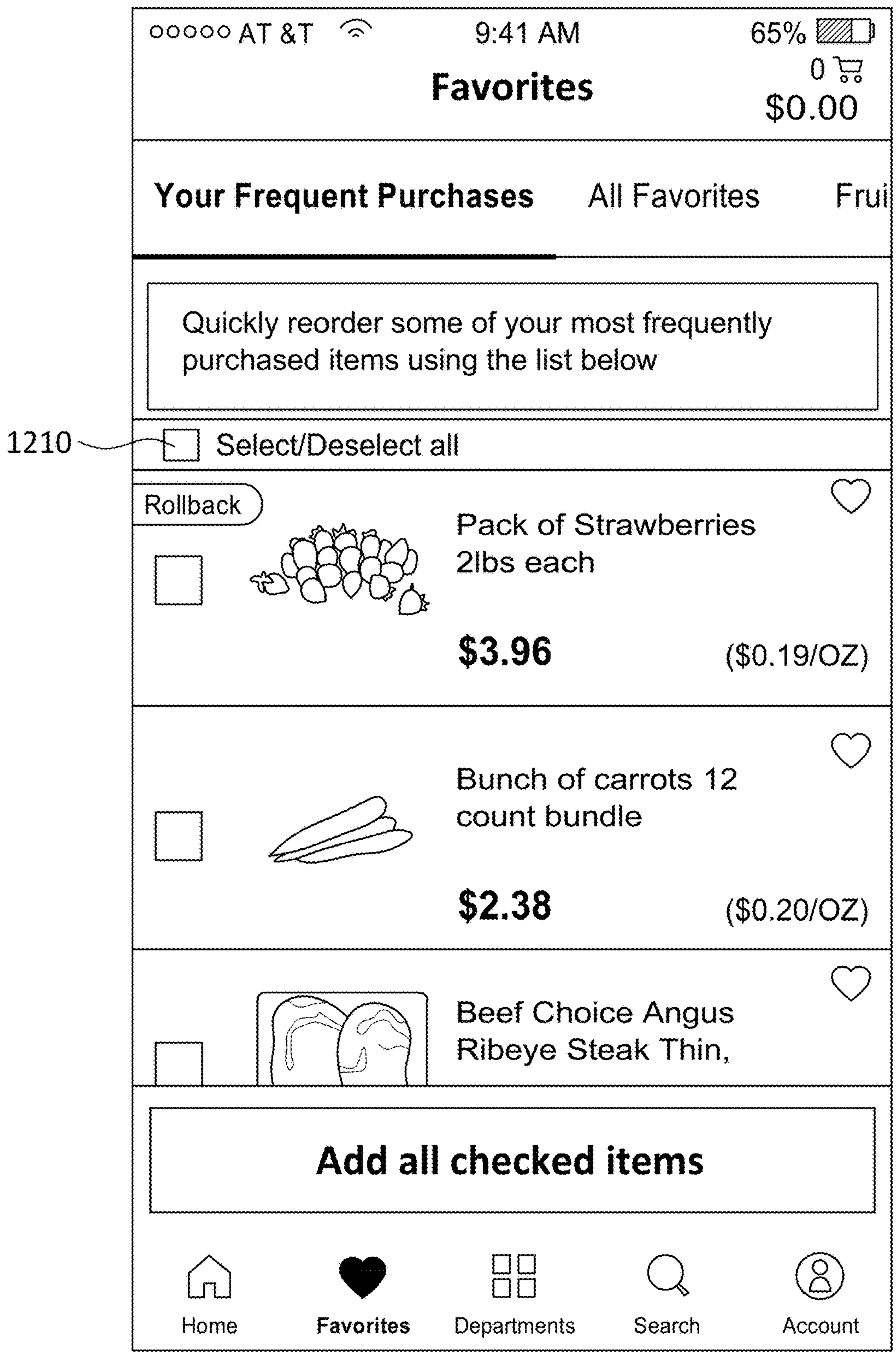
FIG. 12 illustrates an exemplary user interface display.

In several embodiments, method 400 also can include a block 402 of sending instructions to display the set of items to the user on a user interface. In many embodiments, at least a portion of the set of items that can be shown as selected on the user interface. In various embodiments, the user interface can include a single-click option (e.g., a selection option, a selected button, an icon, or other single-select mechanism) to add to a cart all selected items of the set of items. For example, items viewed as “selected” on an interface can include a box with a check mark indicating the item is selected and/or any other suitable indicator approach. Selection and/or de-selection of items is shown in FIGS. 8, 10, and 12, and described below.

In several embodiments, the set of items displayed on the user interface can be fitted on each page of multiple pages that can be digitally resized to adjust the page to be viewed based on a screen size of the user computer. Generally, a smaller-sized screen often cannot display a full set of items at one time, such as, a screen sized on a user interface of a mobile device and/or any other suitable interfaces for smaller devices (e.g., hand-held devices). In various embodiments, the display of the set of items can be adapted (e.g., adjust the fonts, re-size content on the page) to fit on a smaller-sized or larger-sized screen display. In various embodiments, a scrolling module can be configured to display the set of items across multiple scrolling pages. In several embodiments, each of the multiple scrolling pages can include icons and/or any suitable interactive selectors for each item of a respective subset of the set of items displayed on the webpage. In several embodiments, exemplary user interface displays for smaller devices are illustrated in FIGS. 7-12 and be described below.

In many embodiments, block 402 of sending instructions to display the set of items to the user on a user interface can include sending instructions to display an interactive scrolling module (e.g., a scrolling engine and/or a scrolling system) on the user interface. In several embodiments, the scrolling module can be configured to display the set of items across multiple scrolling pages. In some embodiments, each of the multiple scrolling pages can include icons (e.g., buttons, selector options) for a respective subset of the set of items. In many embodiments, each item in the respective subset of items can be automatically selected as the user scrolls through items on a respective page of multiple scrolling pages. In many embodiments, the all selected items added to the cart can include automatically selected items of the respective subsets of the items that have been displayed by the user scrolling through one or more of the multiple scrolling windows. For example, as the user scrolls down, and more items are displayed, all items that have been displayed can be automatically selected, such that all such items are added to the cart when the single-click option is selected.

In several embodiments, the instructions to send to display a scrolling module on the user interface can automatically select items of the respective subsets of the items that have been displayed by the user through the action of scrolling through one or more of the multiple scrolling pages. In various embodiments, a user interface can have an icon and/or any other suitable selector approach to indicate that the user adds to cart all of the selected items in the set of items by a single-click option, which automatically adds all of the items to the cart in a single action. In various embodiments, a user can automatically select items of the respective subsets of the items that have been displayed by scrolling through one or more of the multiple scrolling pages. For example, the set of items to display to the user can comprise twenty-four (24) items, but four (4) items can be displayed on a page at one time in a page. The twenty-four (24) items can thus be spread across six pages. As the user scrolls through each page of the six pages, each item can be automatically selected by that action, thus the user can stop at any page or range of pages, such as page one through page four, and all of the items on pages one through four can be selected, such that if the user selects an indicator to add all to cart the selected items, then the items on page one through page four are added to the cart, but the items that have not been selected in pages five and six are not added to the cart. The user interface displays shown in FIGS. 7-12 and described below illustrate examples of displaying the set of items to the user on the user interface.

In various embodiments, block 402 of sending instructions to display the set of items to the user on a user interface also can include sending instructions to display one or more deselection options to remove one or more items of the set of items from the all selected items. In many embodiments, a model used to determine the probability can be updated based on the user deselecting the one or more items using the one or more of the deselection options. In various embodiments, a deselection option can remove all of the set of items in a single-click approach (not shown). In several embodiments, the user interface displays shown in FIGS. 10-12 and described below illustrate examples of deselection.

In many embodiments, the user interface can display quantity selection options to change a quantity of one or more items in the set of items. In a number of embodiments, a model used to determine that the probability can be updated for future determinations based on the user changing the quantity using one or more of the quantity selection options. In several embodiments, a quantity selector on the user interface can be used to change the quantity of one or more items in a set of items after the set of items are added to a cart. In various embodiments, the quantity selector on the user interface can be used to change the quantity of one or more items in the set of items are added to a cart thereby modifying the number of items selected in the set of items. In several embodiments, the user interface displays shown in FIGS. 9 and 11 and described below illustrate examples of changing quantity of an item.

In several embodiments, method 400 can include a block 403 of receiving a selection of the single-click option to add to the cart the all selected items of the set of items. In several embodiments, the user interface displays shown in FIGS. 8-12 and described below illustrate a single-click option.

In many embodiments, method 400 can include, after receiving the single-click option, a block 404 of adding the all selected items of the set of items to the cart. In several embodiments, the user interface displays shown in FIGS. 8-12 and described below illustrate adding all selected items to the cart.

Figure 5:
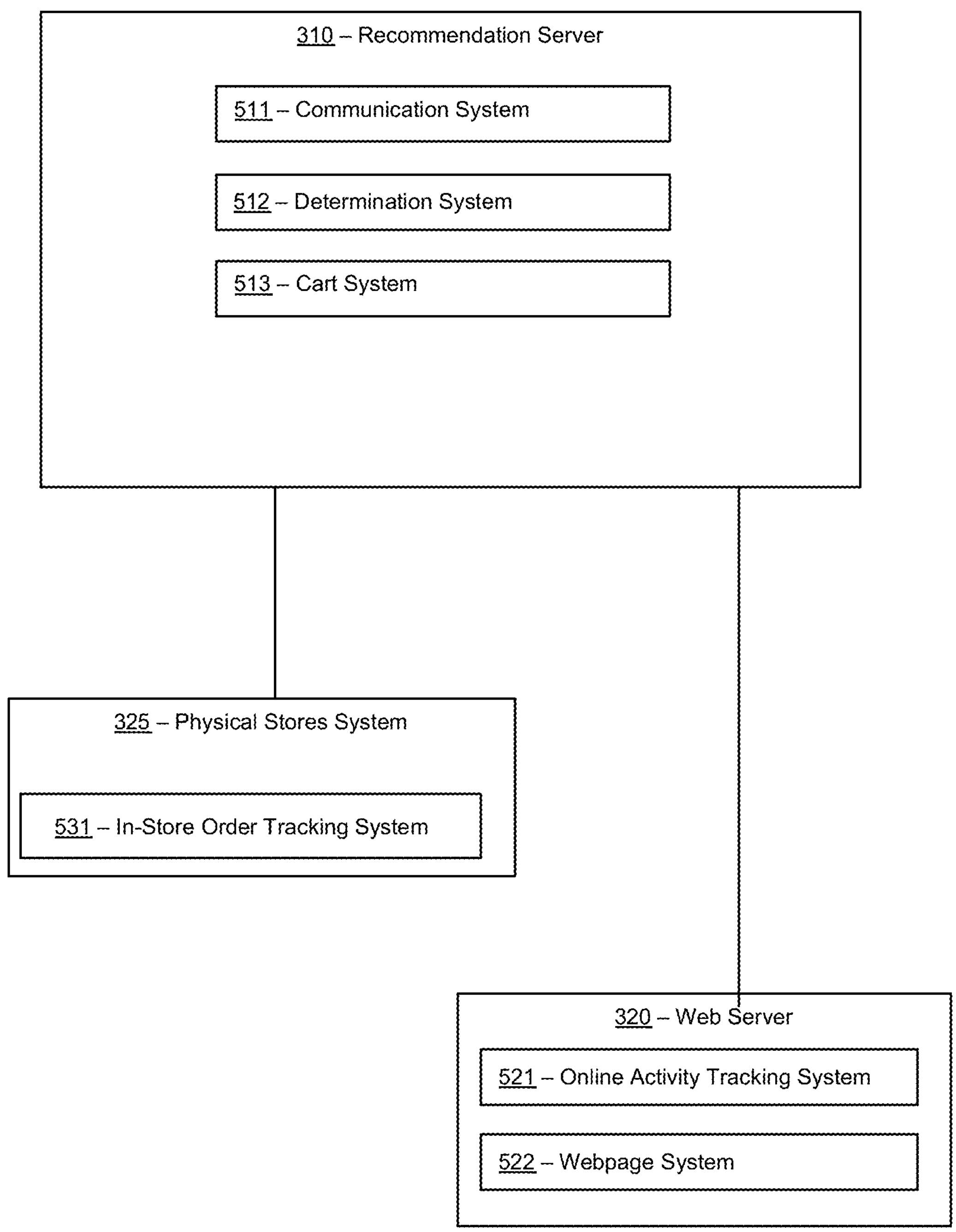
FIG. 5 illustrates a representative block diagram of the system of FIG. 3.

Turning to the next drawing, FIG. 5 illustrates a block diagram of system 300, according to the embodiment shown in FIG. 3. Recommendation server 310, web server 320, and/or physical stores system 325 are merely exemplary and are not limited to the embodiments presented herein. Recommendation server 310, web server 320, and/or physical stores system 325 can be employed in many different embodiments or examples not specifically depicted or described herein. In some embodiments, certain elements or systems of recommendation server 310, web server 320, and/or physical stores system 325 can perform various procedures, processes, and/or acts. In other embodiments, the procedures, processes, and/or acts can be performed by other suitable elements or systems. In many embodiments, the systems of recommendation server 310, web server 320, and/or physical stores system 325 can be modules of computing instructions (e.g., software modules) stored at non-transitory computer readable media. In other embodiments, the systems of recommendation server 310, web server 320, and/or physical stores system 325 can be implemented in hardware.

In many embodiments, recommendation server 310 can include a communication system 511. In a number of embodiments, communication system 511 can at least partially perform block 402 (FIG. 4) of sending instructions to display the set of items to the user on a user interface; block 403 (FIG. 4) of receiving a selection of a single-click option to add to the cart the all selected items of the set of items, block 1705 (FIG. 17, described below) of obtaining reorder likelihood scores for items that a user has ordered historically, and/or block 1735 (FIG. 17, described below) of transmitting for display to the user a user interface comprising the groups of the items.

Figure 17:
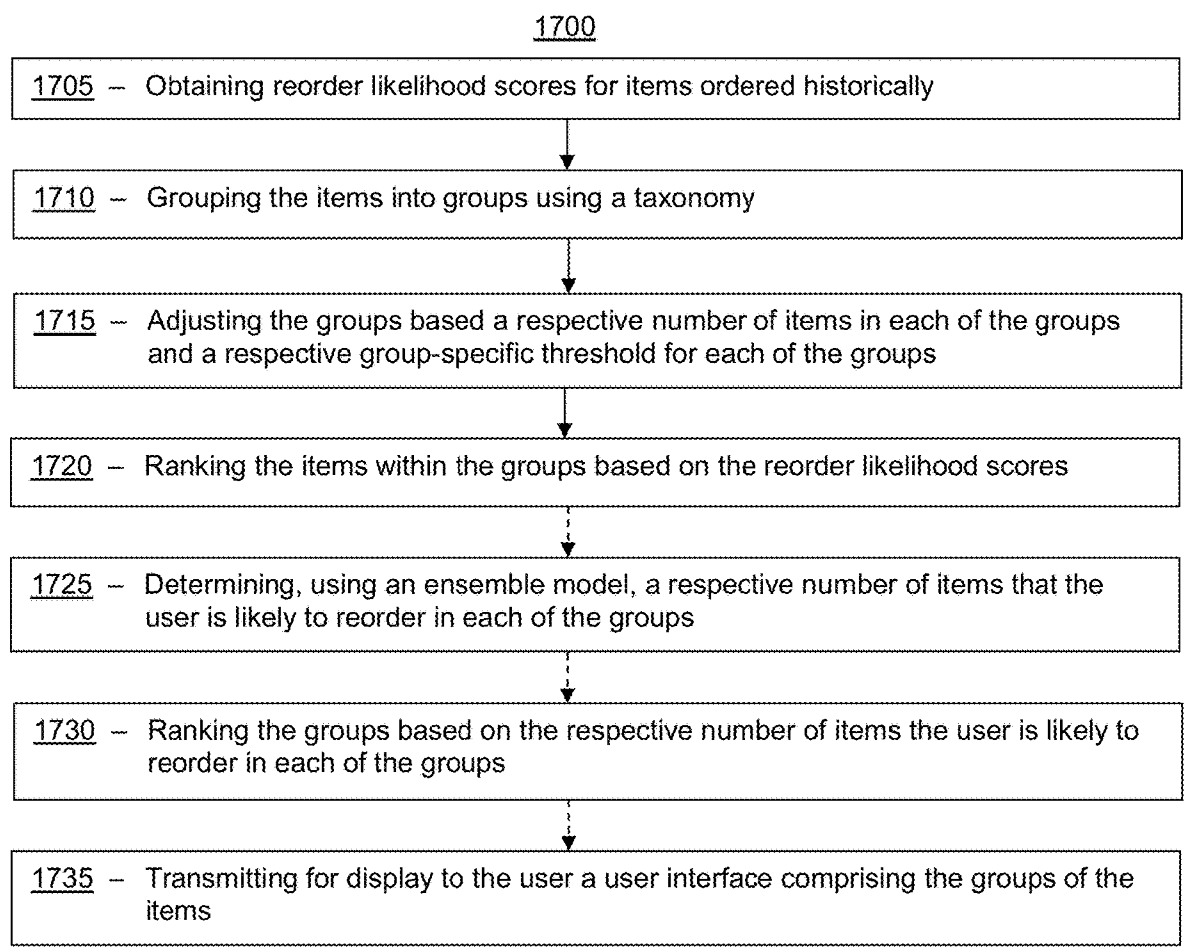
FIG. 17 illustrates a flow chart for a method, according to another embodiment.

In several embodiments, recommendation server 310 also can include a determination system 512. In various embodiments, determination system 512 can at least partially perform block 401 (FIG. 4) of determining a set of items to recommend to a user based on a probability exceeding a predetermined threshold that the user will reorder each item of the set of items at a present time, block 1705 (FIG. 17, described below) of obtaining reorder likelihood scores for items that a user has ordered historically, block 1710 (FIG. 17, described below) of grouping the items into groups using a taxonomy, block 1715 (FIG. 17, described below) of adjusting the groups based on a respective number of items in each of the groups and a respective group-specific threshold for each of the groups, block 1720 (FIG. 17, described below) of ranking the items within the groups based on the reorder likelihood scores, block 1725 (FIG. 17, described below) of determining, using an ensemble model, a respective number of items that the user is likely to reorder in each of the groups, and/or block 1730 (FIG. 17, described below)

of ranking the groups based on the respective number of items the user is likely to reorder in each of the groups.

In some embodiments, recommendation server 310 also can include a cart system 513. In many embodiments, cart system 513 can at least partially perform block 404 (FIG. 4) of adding the all selected items of the set of items to the cart.

In a number of embodiments, web server 320 can include an online activity tracking system 521. In many embodiments, online activity tracking system 521 can at least partially perform gathering information regarding online orders that is provided to determination system 512.

In several embodiments, web server 320 can include a webpage system 522. Webpage system 522 can at least partially perform sending instructions to user computers (e.g., 350-351 (FIG. 3)) based on information received from communication system 511.

In some embodiments, physical stores system 325 can include an in-store order tracking system 531. In-store order tracking system 531 can at least partially perform gathering information regarding in-store orders of a user and other users to be provided to determination system 512.

Turning ahead in the drawings, FIG. 6 illustrates a flow chart of method 600, according to another embodiment. Method 600 can be similar to method 400 (FIG. 4).

In many embodiments, method 600 can begin with user order histories 610 being received. In various embodiments, the data used to determine a probability can be based at least in part on previous transactions of users and/or other users within a first time period can be gathered and stored in user order histories 610. In many embodiments, user order histories 610 can include several hundred thousand, a million, and/or more than a million of orders for a single item by users over a period of time. In several embodiments, the data stored in user order histories 610 can be used as training data and/or input data to train a logistic regression model and/or other suitable machine learning approaches. In some embodiments, the training data received to train the logistic regression model is refreshed periodically during a second period of time in. In various embodiments, the data used as training data stored in user order histories 610 can include features generated by previous transactions of the user and/or other users within a second period of time. In several embodiments, the data used as training data and stored in user order histories 610 can be used in testing a performance of a logistic regression model by evaluating the performance against a set of periodic frequencies of the online transactions and in-store transactions, which can be stored in the user order histories 610, for each item of the set of items to predict a confidence level of the probability.

In several embodiments, method 600 can continue with generating a predictive basket model 620. Predictive basket model 620 can include the logistic regression model, and/or other suitable machine learning approaches. In some embodiments, data (e.g., actual data, input data) stored in user order histories 610 can be used as input into the logistic regression model to determine a reorder likelihood score (e.g., output) of each item of the set of items. The logistic regression model can be similar or identical to logistic regression model in block 401 (FIG. 4). In various embodiments, user order histories 610 can be fed and/or accessed in predictive basket model 620.

In many embodiments, predictive basket model 620 can involve the logistic regression model being trained on previous transactions of the user and other users in which the machine learning model learns with each iteration of training data received to determine the reorder likelihood score for an item. In some embodiments, the training data can include more than a million orders for any single item previously ordered by the user and/or other users over a period of time, such as a year. In various embodiments, predictive basket model 620 can include one or more suitable machine learning models that can predict a reorder likelihood score of an item, such as decision tree model, recurrent neural network model, multi-level learning model, and/or other suitable machine learning models that generate probabilities based on previous orders of the user and/or other users.

In a number of embodiments, predictive basket model 620 can receive and/or access user order histories 610 for current and/or previous order data received from a user and/or other users. In various embodiments, predictive basket model 620 can use data, such as current orders from a user and/or other users to update and/or modify existing reorder likelihood scores for an item based on current data during a period of time, such that the most current likelihood score for an item can be evaluated for display to a user at a particular time of day.

In a number of embodiments, method 600 can continue with generating a listing 630 of reorder likelihood scores for each of the items for a user. In some embodiments, listing 630 can be stored in a database, chart and/or table, and can include reorder likelihood scores for each item of all of the items ordered during a period of time. In several embodiments, reorder likelihood scores can be a probability that a user will likely reorder the item on a given day.

In various embodiments, method 600 can continue with applying a predetermined threshold 640, such as a threshold of 0.4, to determine whether the likelihood score exceeds 0.4, as depicted in FIG. 6. For example, the items with a score above 0.4 indicate a high likelihood that the particular user reorders the items on a given visit to the page. In many embodiments, the actual number of items to be displayed to a user can be based on a predetermined number of items for display, as described above. For example, the number of items that exceed a likelihood score can be more than forty (40) for a particular time and day of the week on a particular visit to a page. The predetermined number of items to be displayed can be sixteen (16) for a particular display screen, such that the 16 items with the highest scores above 0.4 can be displayed to the user interface at that particular time and day.

In a number of embodiments, method 600 can continue with displaying an add-all-to-cart module 650. In various embodiments, add-all-item-to-cart module 650 can include a user interface, such that all of the items that exceed a threshold score within the predetermined number of items to be displayed can be displayed on the user interface in add-all-to-cart module 650.

In several embodiments, add-all-item-to-cart module 650 can include an edit selector 660, located on the user interface to edit items in the set of items. In some embodiments, edit selector 660 can add and/or remove one or more items in the set of items based on the user preference before or after the user selects all of the items to be added to a cart. In several embodiments, adding and/or removing any of the one or more items before or after the user selects all of the items to be added to a cart can become new data gathered in at least user order histories 610 for the future and analyzed as additional data for the item in predictive basket model 620.

In some embodiments, add-all-item-to-cart module 650 can include an add-all-to-cart selector 670, to add all of the items in the set of items, or that are selected, to a virtual cart. In several embodiments, add-all-to-cart selector 670 can be displayed on the user interface as an icon and/or indicator button that, once affirmatively selected, can add all of the items in the set of items to the cart using a single single-click approach.

Figure 7:
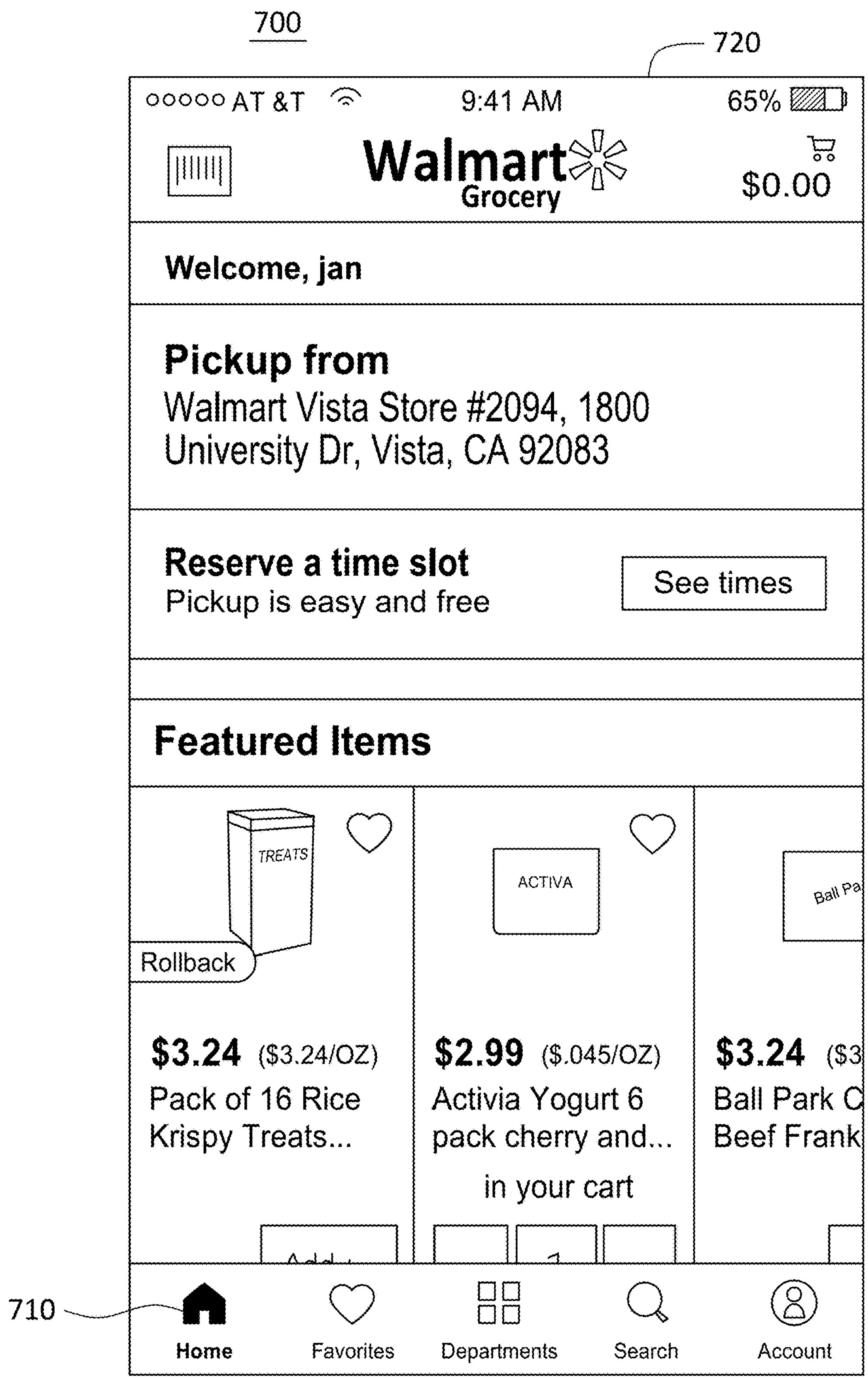
FIG. 7 illustrates an exemplary user interface display showing a homepage of a website.

Turning ahead in the drawings, FIG. 7 illustrates an exemplary user interface display 720 showing a homepage of a website. User interface display 720 is merely exemplary, and embodiments of the single-click predictive platform model can be employed in many different embodiments or examples not specifically depicted or described herein. In a number of embodiments, the homepage can be a first webpage of a website viewed on a mobile device of a user. In many embodiments, user interface display 720 can include a menu that displays one or more interactive functions, such as a selection button 710 (e.g., an icon) that can be used to display a homepage of the website.

Turning ahead in the drawings, FIG. 8 illustrates an exemplary user interface display 800 showing a favorites page 870. In a number of embodiments, favorites page 870 can be a page that is personalized to a user to show items that the user orders most frequently and/or is likely to reorder. User interface display 800 is merely exemplary, and embodiments of the single-click predictive platform model can be employed in many different embodiments or examples not specifically depicted or described herein. In some embodiments, favorites page 870 can include a favorites title bar 810, a frequent purchases section 820, a first interactive selection box 830, a second interactive selection box 840, and a menu including menu options, such as a favorites menu option 850 and an account menu option 860.

In various embodiments, favorites title bar 810 can indicate that the user has entered the interactive favorites page to view the set of items recommended for the user for a specific time and day. In many embodiments, a separate interactive favorites page can operate independently of the one or more other interactive windows performing specific functions that may modify and/or change the user interface to perform a function and/or operation associated with displaying personalized favorites of a user as stored.

In several embodiments, frequent purchases section 820 can display each item in the set of items for selection or deselection. In many embodiments, selecting frequent purchases section 820 can include instructions to leave the window and activate (e.g., open) another independent window storing different information of the user.

In several embodiments, first interactive selection box 830 can include one or more icons or graphical elements. In some embodiments, first interactive selection box 830 can display each item of the set of items individually with a separate indicator icon (e.g., check box, selector) located next to the item information, in which the separate indicator icon can be selected via an interface on the mobile device. In many embodiments, the separate indicator icons of first interactive selection box 830 can be automatically selected when the user scrolls through the screens displayed on a mobile device, as described above in connection with block 402 (FIG. 4).

In many embodiments, second interactive selection box 840 can provide a single-click option to add all selected (e.g., checked) items of the set of items to the virtual cart.

In some embodiments, favorites menu option 850 can include a heart design with the word "Favorite" written below the heart design and/or any other suitable design and wording. In many embodiments, a user can select favorites menu option 850 from the menu on the user interface to activate (e.g., open) favorites page 870 displaying favorites personalized for the user.

In various embodiments, account menu option 860 can include a person design with the word "Account" written below the design and/or any other suitable design and wording. In many embodiments, the user can select account menu option 860 from the menu on the user interface to activate (e.g., open) a separate page that displays account information personalized to the user. In a number of embodiments, selecting account menu option 860 can activate a security approach to safeguard the privacy of the user account information to be viewed by the user, which can include anti-theft, anti-fraud, and/or any other suitable privacy measures before the account information can be displayed on the user interface.

Figure 9:
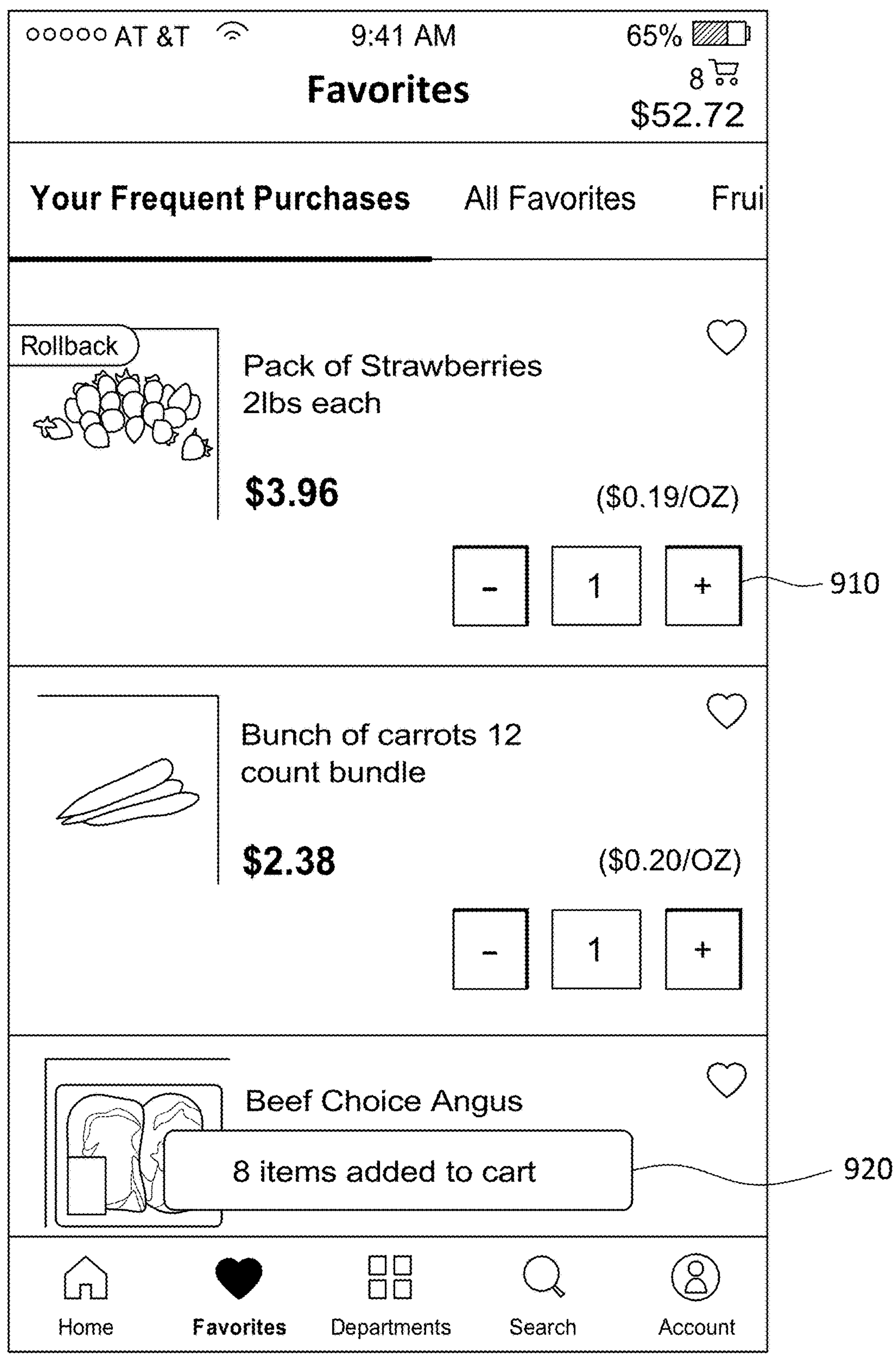
FIG. 9 illustrates an exemplary user interface display.

Turning ahead in the drawings, FIG. 9 illustrates an exemplary user interface display 900 showing a favorites page. User interface display 900 can be similar to, and can include various components of, user interface display 800 (FIG. 8). In many embodiments, user interface display 900 can include a quantity selector 910 and a notification 920.

In various embodiments, quantity selector 910 can be used by a user interacting with the user interface to increase and/or decrease the number of items selected, such as by selecting a minus sign icon to decrease a number of items or by selecting a plus sign icon to increase a number of items. In some embodiments, a quantity selection 910 can be used after selecting second interactive selection box 840 (FIG. 8), which can adjust the quantity of the items already added to the cart. In several embodiments, quantity selection 910 can be used prior to selecting second interactive selection box 840 (FIG. 8), which can edit the quantity of the items to be added to the cart.

In many embodiments, notification 920 can indicate the number of items added to the cart using the single select option, such as second interactive selection box 840 (FIG. 8).

Turning ahead in the drawings, FIG. 10 illustrates an exemplary user interface on a user interface display 1000 showing a favorites page. User interface display 1000 can be similar to, and can include various components of, user interface display 800 (FIG. 8) and/or user interface display 900 (FIG. 9). In some embodiments, user interface display 1000 can include a deselector option 1010 for a user to deselect (e.g., unselect) one or more items prior to using second interactive selection box 840 (FIG. 8), such that the one or more items that are deselected are not added to the virtual cart. In many embodiments, deselector option 1010 can be used to deselect a selected item, such as an item in first interactive selection box 830 (FIG. 8), as previously automatically selected by the action of scrolling through one or more webpages of items of the set of items, prior to using second interactive selection box 840 (FIG. 8) to add all selected items to the virtual cart.

Figure 11:
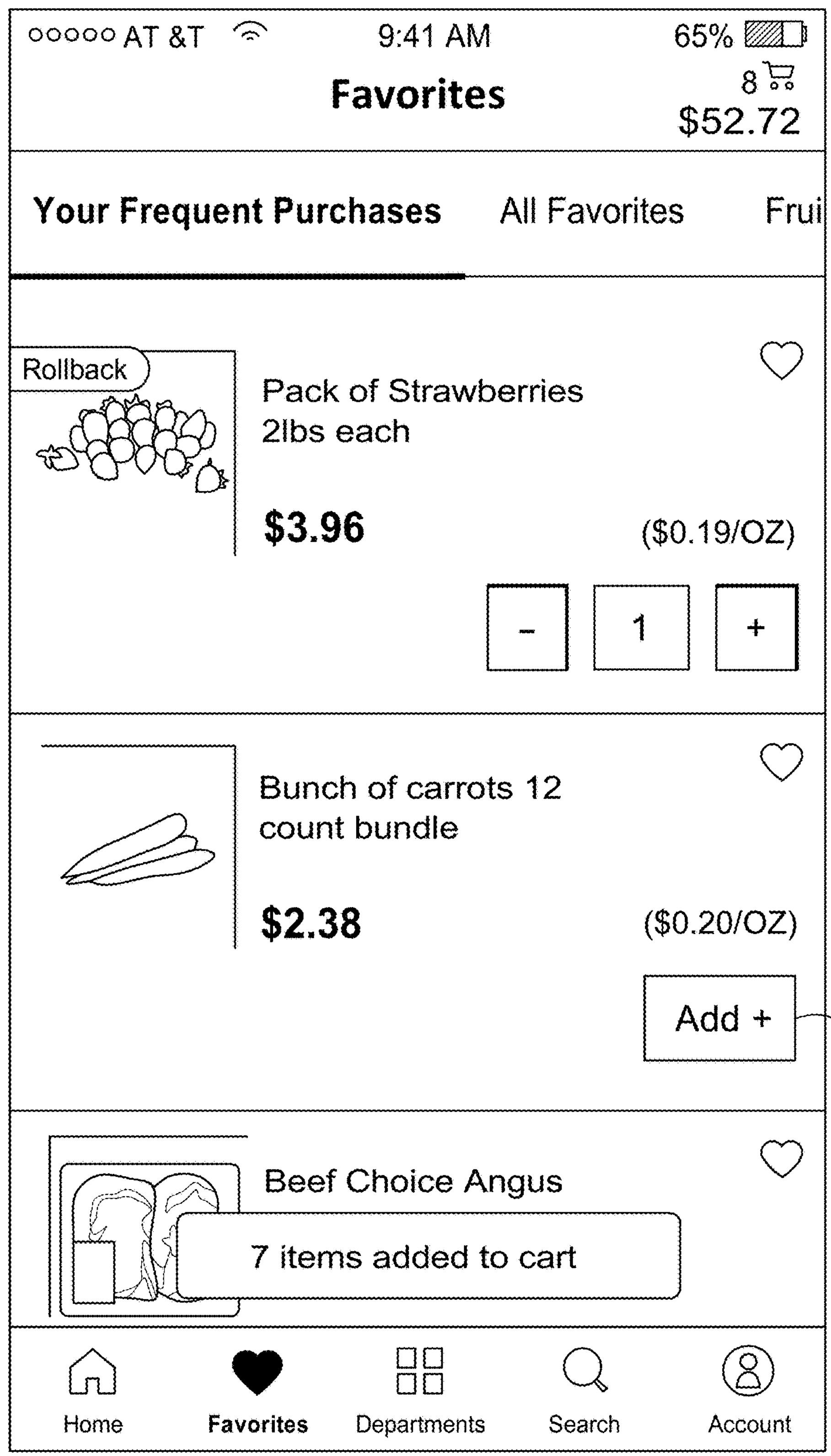
FIG. 11 illustrates an exemplary user interface display.

Turning ahead in the drawings, FIG. 11 illustrates an exemplary user interface 1100 showing a favorites page. User interface display 1100 can be similar to user interface display 800 (FIG. 8), user interface display 900 (FIG. 9), and/or user interface display 1000 (FIG. 10). User interface display 1100 can include an add selector 1110 (e.g., button) to add (e.g., increase) a quantity of an item of the selected items to increase the number of the item to order. In some embodiments, add selector 1110 can be used after second interactive selection box 840 (FIG. 8). In several embodiments, add selector 1110 can be used prior to using second interactive selection box 840 (FIG. 8).

Turning ahead in the drawings, FIG. 12 illustrates an exemplary user interface display 1200 showing a favorites page. User interface display 1200 can be similar to, and can include various components of, user interface display 800 (FIG. 8), user interface display 900 (FIG. 9), user interface display 1000 (FIG. 10), and/or user interface display 1200 (FIG. 12). User interface display 1200 can include a group selector 1210, which can be used to select and/or deselect all of the items of the set of items. In some embodiments, group selector 1210 can include a single-click option to deselect all of the set of items prior to using the second interactive selection box 840 (FIG. 8). In many embodiments, group selector 1210 can deselect all of the items automatically selected by the action of scrolling through one or more webpages of items of the set of items prior to using second interactive selection box 840 (FIG. 8).

Jumping ahead in the drawings, FIG. 17 illustrates a flow chart for a method 1700, according to another embodiment. In some embodiments, method 1700 can be a method of automatic item grouping and personalized department layout for reorder recommendations. Method 1700 is merely exemplary and is not limited to the embodiments presented herein. Method 17400 can be employed in many different embodiments and/or examples not specifically depicted or described herein. In some embodiments, the procedures, the processes, and/or the activities of method 1700 can be performed in the order presented. In other embodiments, the procedures, the processes, and/or the activities of method 1700 can be performed in any suitable order. In still other embodiments, one or more of the procedures, the processes, and/or the activities of method 1700 can be combined or skipped. In several embodiments, system 300 (FIGS. 3, 5) can be suitable to perform method 1700 and/or one or more of the activities of method 1700.

In these or other embodiments, one or more of the activities of method 1700 can be implemented as one or more computing instructions configured to run at one or more processors and configured to be stored at one or more non-transitory computer-readable media. Such non-transitory computer-readable media can be part of a computer system such as recommendation server 310 (FIGS. 3, 5), web server 320 (FIGS. 3, 5), and/or physical stores system 325 (FIGS. 3, 5). The processor(s) can be similar or identical to the processor(s) described above with respect to computer system 100 (FIG. 1).

Referring to FIG. 17, method 1700 can include a block 1705 of obtaining reorder likelihood scores for items that a user has ordered historically. The reorder likelihood scores can be similar or identical to the reorder likelihood scores described above in connection with block 401 (FIG. 4) and/or as listed in listing 6340 (FIG. 6). In some embodiments, block 1705 can involve generating the reorder likelihood scores, as described above. In other embodiments, block 1705 can receive the reorder likelihood scores.

In a number of embodiments, method 1700 also can include a block 1710 of grouping the items into groups using a taxonomy. In some embodiments, the items that the user has ordered historically that are included in the groups can have reorder likelihood scores above a predetermined threshold. The predetermined threshold can be similar or identical to predetermined threshold 640 (FIG. 6). The taxonomy can be a hierarchical item categorization scheme used to categorize the items. For example, an item that is Great Value 2% milk can be categorized in a "Food" department (level 1 ("L1")), in an "Eggs and Dairy" category (level 2 ("L2"), and in a "Milk" subcategory (level 3 ("L3")). In some embodiments, the initial groups can be at the category level. In other embodiments, the initial groups can be at the subcategory level. In still other embodiments, the initial groups can be at the department level.

In several embodiments, method 1700 additionally can include a block 1715 of adjusting the groups based on a respective number of items in each of the groups and a respective group-specific threshold for each of the groups. For example, the groups can be adjusted by drilling up (e.g., merging groups) or drilling down (e.g., splitting groups) in the taxonomy. In some embodiments, block 1715 can include splitting one or more of the groups based on the respective number of items in each of the groups and the respective group-specific threshold for each of the groups, and/or merging two or more of the groups based on the respective number of items in each of the groups and the respective group-specific threshold for each of the groups.

In a number of embodiments, the groups can be adjusted such that the number of items in each group can be not too few and not too many. The amounts that define too few or too many can be based on the group-specific thresholds for the groups, as described below. In several embodiments, the groups can be adjusted to provide a good representation of different items, and/or the adjustments can consider an ideal basket composition.

In some embodiments, the group-specific thresholds can be different for different groups. For example, in comparing the "Food" and "Toilet Paper" groups, the "Food" category will typically have many more items in many different subcategories, so the group-specific threshold for the "Food" group can be lower than for the "Toilet Paper" group. In many embodiments, a heuristic and/or model-based category-to-subcategory breakdown can be used, such as using the reorder likelihood scores generated in the predictive basket model described above to consider reorder likelihood within subcategories.

In many embodiments, depending on the number of items that a user has in each level of the item taxonomy, block 1715 can adjust the groups to include the items at various different levels. For example, if a first user has 30 items in the "Eggs and Dairy" L2 category, which can be above a group-specific threshold of 10 for the "Eggs and Dairy" L2 category, block 1715 can drill down further to split the group into the following four groups: 6 items in the "Milk" subcategory, 9 items in "Cheese" subcategory, 7 items in "Eggs" subcategory, and 8 items in "Yogurt" subcategory. These items can be grouped at the L3 subcategory levels of Milk, Cheese, Eggs, and Yogurt instead of the L2 category of "Eggs and Dairy." If a second user has 10 items in the "Eggs and Dairy" L2 category, the group-specific threshold of 10 for the "Eggs and Dairy" L2 category is not exceeded, so the items can remain grouped at the L2 category level of "Eggs and Dairy." If a third user has 3 items in the L2 category of "Eggs and Dairy" under the L1 department of "Food" and 2 items in the L2 category of "Condiments, Sauces & Spices" under the L1 department of "Food," block 1715 can drill up to merge the two groups into a single group at the L1 department level of "Food," which would include the five items previously in the L2 categories of "Eggs and Dairy" and "Condiments, Sauces & Spices." In some embodiments, this merging can be performed before the "Food" department has a group-specific threshold that is more than 5 items. If a fourth user has 15 items in the "Party Supplies & Crafts" L1 department, and the "Party Supplies & Crafts" group has a group-specific threshold of 20 items, the group-specific threshold of 20 items is not exceeded, so the items can remain grouped at the L1 department level of "Party Supplies & Crafts."

In a number of embodiments, the group-specific threshold for one group can be different from the group-specific threshold of another group. The group-specific threshold for the number of items beyond which the group is split further into its subgroups can depend on the specific department, category, and/or subcategory in the taxonomy. Some categories of groupings, such as "Eggs and Dairy" at the L2 category level typically have a lot more items than categories such as "Party Supplies & Crafts," at the L1 department level, so a lower group-specific threshold (e.g., 10) can be used for the "Eggs and Dairy" groupings, while a higher group-specific threshold (e.g., 20) can be used for "Party Supplies & Crafts" groupings.

In a number of embodiments, block 1715 can make use of the reorder likelihood score, which can be item specific, for popular categories such as "Food," "Fruits and Vegetables," etc. The reorder likelihood score can be a score between 0 and 1 for each item the user has historically ordered, and the score can be interpreted as the probability of the user reordering (e.g., repurchasing) that item in the next two weeks (or within another suitable time period). If the user has too many items at a particular level L2 with a reorder likelihood score above a pre-defined threshold, the level can be split down further into its constituent categories at level L3.

In a number of embodiments, method 1700 further can include a block 1720 of ranking the items within the groups based on the reorder likelihood scores. After the groups have been adjusted in block 1715, the items can be ranked within each of the groups based on the reorder likelihood scores of the items. For example, the reorder likelihood scores can be obtained in block 1705 for each item the user has ordered. These reorder likelihood scores can be based on the user's historical transactions and preferences, and can be obtained in block 1705 (e.g., generated using the predictive basket model described above or otherwise received). For example, the reorder likelihood scores for the user can be as follows:

Bananas—0.92
Horizon Milk—0.90
Great Value Eggs—0.82
Mangoes—0.68
. . . (many items omitted for simplicity)
Laundry detergent—0.05

These items can be grouped in different item groups in block 1710 based on the item taxonomy, and these groups can be adjusted in block 1715, such as based on group-specific thresholds and/or reorder likelihood scores.

In block 1720, these items can be ranked within each group in descending order of the reorder likelihood scores, such as follows:

Fruits and Vegetables
  Bananas, Mangoes, . . .
Eggs & Dairy
  Horizon Milk, Great Value Eggs, . . .
Household Essentials
  Laundry detergent
. . . (many items groups and items omitted for simplicity)

In some embodiments, the item groups and/or rankings generated can be used to display the items to the user in the user interface for reordering, which can assist the user in reordering items. For example, a user interface can be presented to the user, as described below in block 1735. For a loyal user, on average, 50%-80% of the user's basket is reordered items. A user can have hundreds of items that the user has ordered in the past. Listing all of these items can involve many pages of display, which can result in the user extensively scrolling in order to find and add items to the cart to reorder. Conventionally, displays for items to be reordered have no indication of a user's affinity to the item, which can lead to frustration by the user when reordering and/or can lead to the user switching to item-level searching (e.g., keyword searching for items) to find items to reorder because the items the user seeks to reorder are not readily found in the reorder user interface.

In many embodiments, the techniques described herein can provide an organized, uncluttered page for facilitating customized (e.g., optimal) groupings of items. In some embodiments, the items can be grouped logically by department, category, and/or subcategory, and such groups can be adjusted by drilling up or down the taxonomy for personalized grouping based on the number of re-orderable items per group for the user. In various embodiments, the model-based reorder likelihood score, which creates a dynamic item score for each item that is personalized to the user, can be used to rank the items within the groups based on the user's orders and/or preferences.

In several embodiments, the techniques described herein can beneficially provide increased user satisfaction, loyalty, and stickiness. For example, the techniques described herein can result in less time spent reordering, which can allow for more time for exploring new items, which can lead to larger orders. As another example, the techniques described herein can result in reduced user churn due to frustration from not being able to find favorite items, and/or reduced switching (i.e., "bouncing") from the reorder user interface to the item search user interface. By decreasing the bouncing from the reorder user interface to the item search user interface, the user can have less chance of forgetting the items the user desires to order.

In several embodiments, method 1700 additionally and optionally can include a block 1725 of determining, using an ensemble model, a respective number of items that the user is likely to reorder in each of the groups. In a number of embodiments, the ensemble model can be a random forests model of decision trees. In several embodiments, predictions generated by the decision trees can be averaged for each of the groups. In many embodiments, the ensemble model can be based on a set of features, which can include one or more of the following: a number of orders, a recency of orders, a monetary value at the user level, a monetary value at the department level, reorder rates, similar item orders, and/or basket sizes.

Random forests are a machine-learning algorithm that makes use of an ensemble of decision trees in order to generate a prediction for a use case. In this case, the use case is to predict the number of items a user will reorder at the current time in a group. Separate models can be built for each group, with each model having its own set of decision tree ensembles.

Turning back in the drawings, FIG. 13, as described above, illustrates a method 1300 for using a decision tree. The method described above can be used again, but for trained on a different purpose, which can use different features. More specifically, the decision tree can be trained to predict the number of items (e.g., unique items/unique SKUs) that the user is likely to reorder in the group at issue. At each decision point of the decision tree, such as decision points 1302-1304, one feature of the set of features can be selected to split the input training data into different branches of the decision tree. For example, at decision point 1302, the decision can ask whether or not the number of orders in the group is greater than a threshold K. If the output of decision point 1302 is YES, the model branches to the left to decision point 1303. If the output of decision point 1302 is NO, the model branches to the right to decision point 1304. At decision point 1303, the decision can ask whether or not the previous number of items is greater than a threshold N. If the output of decision point 1303 is YES, the model branches to the left to a further decision point (not shown), and if the output of decision point 1303 is NO, the model branches to the right to a further decision point (not shown). At decision point 1304, the decision can ask whether or not the previous number of items in a sister group is greater than the threshold N. If the output of decision point 1304 is YES, the model branches to the left to a further decision point (not shown), and if the output of decision point 1304 is NO, the model branches to the right to a further decision point (not shown). Each tree can use different features and decisions at the decision points.

After traversing further down the tree, training data with similar features are more likely to be in the same tree node, and eventually, each path from the root of the tree to the leaf nodes at the bottom of the tree leads to a predictive decision point with regards to how many items the user is likely to reorder at the current time in a group. For example, the prediction from the tree flow following the left-most path to leaf node 1305 can be 20, the prediction for leaf node 1306 can be 10, and the prediction for leaf node 1307 can be 2.

At each decision point in the tree, the model can learn a feature (e.g., an optimal feature) to be used to split the tree, and the corresponding value for each feature (e.g., the values of thresholds “K” and “N”). The features that are used to split the tree further can be selected by attempting to minimize the amount of variance in the data split obtained by using that particular feature to split the tree. For example, the model can learn that the value of K is 10 and the value of N is 5 for a group. These values can be different when trained for each group (e.g., different for the “Eggs and Dairy” group than for the “Beverages” group). This training can be performed using historical training data based on how many items the user and/or other users ordered in the past in the group at issue.

In a number of embodiments, random forests can build upon this decision tree model by combining multiple trees to make a prediction, by making use of randomization to sample the original training data, and/or by selecting a subset of features at each decision point in the tree. In many embodiments, the random forests model can use an ensemble of decision trees, such as approximately 20 to 150 decision trees, and the predictions generated from the multiple decision trees for a group can be averaged across the decision trees for the group to yield the final prediction for the group. As a simplified example, if the number of decision trees is three, and the first tree resulted in prediction of 10, the second tree resulted in a prediction of 12, and the third tree resulted in a prediction of 14, then the final prediction can be the average of these three trees, which is 12.

The number of trees, depth of the trees, and other model parameters can be chosen based on the training data and model performance on each group’s prediction tasks, and the feature and value splits learned by the algorithm can be different for each model. For example, the model for “Fruits and Vegetables” can have 100 trees with a tree depth of 5, while the model for “Party Supplies & Crafts” can have 20 trees, with a tree depth of 3.

In some embodiments, the prediction can be used when there is high enough confidence in the prediction. Various factors can be used for determining confidence in a particular model’s prediction, such as the range between minimum and maximum of each tree’s predictions, how much data is available for that particular user (e.g., as model predictions for a user with 10 transactions in a group can result in more confidence than predictions for a user with 2 transactions in a group), statistical methods for generating confidence intervals for predictions, and/or other suitable factors.

In many embodiments, the predictive basket model used to generate reorder likelihood scores described above can be used to cap or decide the number of items shown per department when there is low confidence in the predictions for a groups’ ranking model. For example, this method can start by choosing a score threshold (such as at the lower end of the reorder likelihood scores, e.g., 0.05, to avoid removing too many items from being eligible to be shown in the module). Next, the method can include determining how many items a user has above a particular threshold. Those items above the threshold can be included. This approach can prevent users from seeing too many items in the page so that the users can spend less time in building their baskets.

In a number of embodiments, user feedback can be used to fine-tune the models. For example, user interactions and/or ordering patterns can be monitored with the department ranking made in block 1730 (FIG. 17), described below, based on model predictions. This method can begin with comparing the number of items the user orders in a group vs. what was predicted by the ensemble model and/or decision tree models. Next, the method can include identifying groups and/or models that consistently underpredict or overpredict, and use updated data and retrain the models for these groups. For models in which the predictions are accurate, the method can evaluate whether similar model parameters and feature sets can be used for the less accurate models.

Returning to FIG. 17, in a number of embodiments, method 1700 further and optionally can include a block 1730 of ranking the groups based on the respective number of items the user is likely to reorder in each of the groups. For example, the groups can be ranked based on the respective prediction generated in block 1725 for each group.

For example, consider the example described above in connection with block 1720 in which the following groups included items ranked as follows:

Fruits and Vegetables
  Bananas, Mangoes, . . .
Eggs & Dairy
  Horizon Milk, Great Value Eggs, . . .
Household Essentials
  Laundry detergent
. . . (many items groups and items omitted for simplicity)

The ensemble model can be used to generate predictions in block 1725 for how many items the user will order in each item group. For example, the predictions can be as follows:

Fruits and Vegetables=6
Eggs & Dairy=9
. . . (many groups omitted for simplicity)
Household Essentials=1

These groups can be ranked in descending order in block 1730 based on the model predictions, as follows:

Eggs & Dairy
Fruits and Vegetables
. . . (many groups omitted for simplicity)
Household Essentials In several embodiments, method 1700 additionally and optionally can include a block 1735 of transmitting for display to the user a user interface comprising the groups of the items. In many embodiments, the groups can be ordered in the user interface based on the ranking of the groups generated in block 1730. In several embodiments, the items can be ordered within the groups based on the ranking of the items within the groups, as generated in block 1720. In many embodiments, a respective number of items displayed within each of the groups can be limited based on the respective number of items that the user is likely to reorder in each of the groups, as generated in block 1725. For example, if the prediction in block 1725 for the "Eggs & Dairy" group predicts that the user will order 9 items from that group, then the top 9 items in the item ranking for that group can be displayed in the user interface for the "Eggs & Dairy" group.

Figure 14:
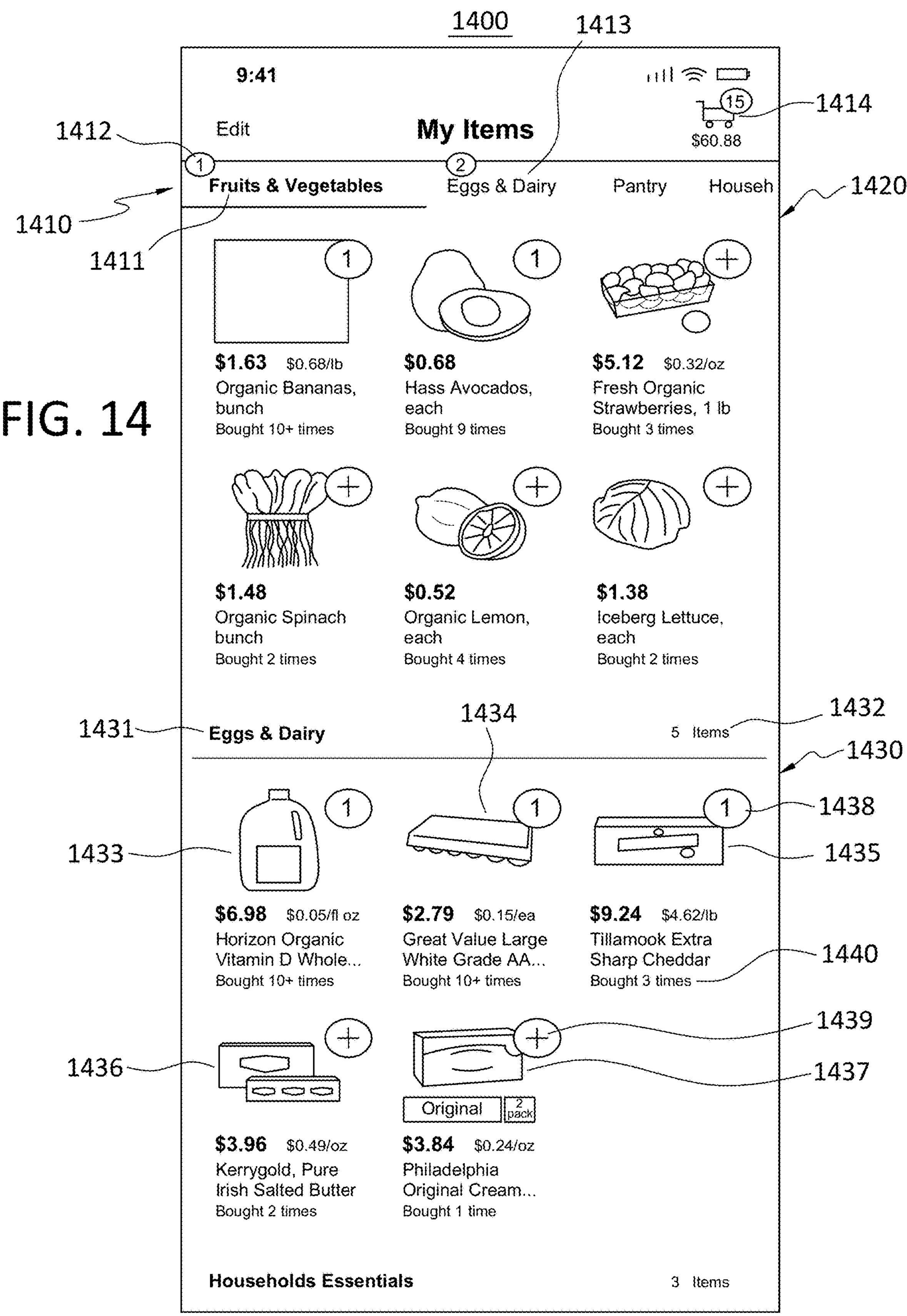
FIG. 14 illustrates an exemplary user interface display showing a reorder page, according to an embodiment.

Turning back in the drawings, FIG. 14 illustrates an exemplary user interface display 1400 showing a reorder page, according to an embodiment. In a number of embodiments, the reorder page can be a page that is personalized to a user to show items that the user orders most frequently and/or is likely to reorder. User interface display 1400 is merely exemplary, and embodiments of the user interface can be employed in many different embodiments or examples not specifically depicted or described herein.

In some embodiments, user interface display 1400 can include a group menu 1410, which can list the groups, such as a group 1411 for the "Fruits & Vegetables" group and a group 1413 for the "Eggs and Dairy" group. In a number of embodiments, there can be a number indicator associated with each of the groups listed in group menu 1410, such as a number indicator 1412 associated with group 1411, which can indicate how many items in group 1411 have been added to the cart. The cart can be accessed using a cart logo 1414. In some embodiments, such as shown in FIG. 14, cart logo 141 can include an indicator of how many total items have been added to the cart.

In several embodiments, user interface display 1400 can include group displays, such as a group display 1420 for group 1411, and a group display 1430 for group 1413. In many embodiments, the ordering of the groups in group menu 1410 and/or the ordering of the group displays can be based on the ranking of the groups generated in block 1730 (FIG. 17). For example, it can be predicted that the user will order 6 items in the "Fruits & Vegetables" group, and 5 items in the "Eggs & Dairy" group, so the "Fruits & Vegetables" group can be listed and/or displayed first, as shown in FIG. 14. In many embodiments, a user can navigate to a different display group (e.g., 1420, 1430) by selecting a group (e.g., 1411, 1413) in group menu 1410.

In several embodiments, the group display can include a group category name, a group number indicator, and a visual display of the items within the group. For example, group display 1430 can include a group category name 1431, such as "Eggs and Dairy," a group number indicator 1432, and items 1433-1437, which can be items within group 1413 of "Eggs and Dairy." In many embodiments, items 1433-1437 can be ordered based on the item ranking generated in block 1720 (FIG. 17). For example, item 1433 can be the most likely item from among items 1433-1437 for the user to order at this time. Group number indicator 1432 can indicate that there are 5 items listed, which can be the number determined in block 1725 (FIG. 17) for the group. In many embodiments, the number of items included in the group display can be fewer than the total number of items the user has ordered in the past in that group, as the number of items displayed can be limited based on the predicted number determined in block 1725 (FIG. 17). In several embodiments, each item can include a picture of the item, a price of the item, a unit price of the item, a title and/or descriptor of the item, an order option and/or order quantity, and/or a historical order indicator. For example, item 1435 can include a historical order indicator 1440, which can indicate that the user has ordered item 1435 on three previously occasions. Item 1435 can include an order quantity 1438, which indicates that the user has added 1 of the item to the cart. By clicking on order quantity 1438, the user can add more of item 1435 in the cart, decrease the number of item 1435 in the cart, and/or remove item 1435 from the cart. Item 1437 can include an order option 1439 with a "+" symbol, which can indicate that item 1437 has not yet been added to the cart, and which can allow the user to add item 1437 to the cart by clicking on order option 1439.

In a number of embodiments, the user interface can allow the user to choose other options for sorting and/or filtering the groups and/or items displayed. For example, in some embodiments, the user interface can allow the user to sort and/or filter by taxonomy alphabetically or hierarchically, to sort and/or filter by order date and/or recency, to sort and/or filter by order frequency, to sort and/or filter by reorder likelihood (e.g., as determined by the reorder likelihood score), and/or to sort and/or filter by other suitable considerations. In several embodiments, the user interface can customize thresholds for different groups and/or for different user segments. In a number of embodiments, the group-level model predictions can be fine-tuned and/or revised based on user interaction, such as updated based on reorder rates to retrain the model.

In many embodiments, ranking the groups and/or limiting the number of items in each group can beneficially assist the user in reordering the items that the user is most likely to reorder at the time that the particular user is using the user interface to reorder items. This layout can be personalized and updated dynamically for each user, with a personalized group ranking and/or a personalized number of items per group. In several embodiments, the techniques described herein can allow users to have a better view of re-orderable items to quickly navigate to those items and/or select those items, which can reduce time spent browsing items to reorder. In several embodiments, the techniques described herein can advantageously allow the user to sort and/or filter items based on the user's intent.

Figure 15:
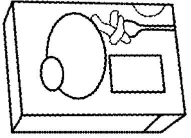
FIG. 15 illustrates an exemplary user interface display showing a reorder page with an out-of-stock item.

In some embodiments, the user interface further can include alternatives for out-of-stock items. Turning ahead in the drawings, FIG. 15 illustrates an exemplary user interface display 1500 showing a reorder page with an out-of-stock item 1510. In a number of embodiments, the reorder page can be a page that is personalized to a user to show items that the user orders most frequently and/or is likely to reorder. User interface display 1500 is merely exemplary, and embodiments of the user interface can be employed in many different embodiments or examples not specifically depicted or described herein.

In some embodiments, user interface display 1500 can include a group of items, such as items 1510-1514, which can be recommended to the user to be reordered. For items that are in-stock, such as item 1511, an add-to-cart button 1522 can allow the user to add the item to the cart. For items that are out-of-stock, an indicator, such as an indicator 1520, can indicate that the item is out-of-stock (e.g., out-of-stock item 1510). For example, out-of-stock item 1510 can be for "Great Value Classic Alfredo Pasta Sauce, 22 oz.," and item 1510 can be out-of-stock. In a number of embodiments, a similar items button 1521 can be included with item 1510 instead of an add-to-cart button (e.g., 1522). Similar items button 1521 can allow the user to view items that are similar to out-of-stock item 1510. When the user selects similar items button 1521, the user interface can proceed to a similar items page, such as shown in user interface display 1600 (FIG. 16), described below.

Figure 16:
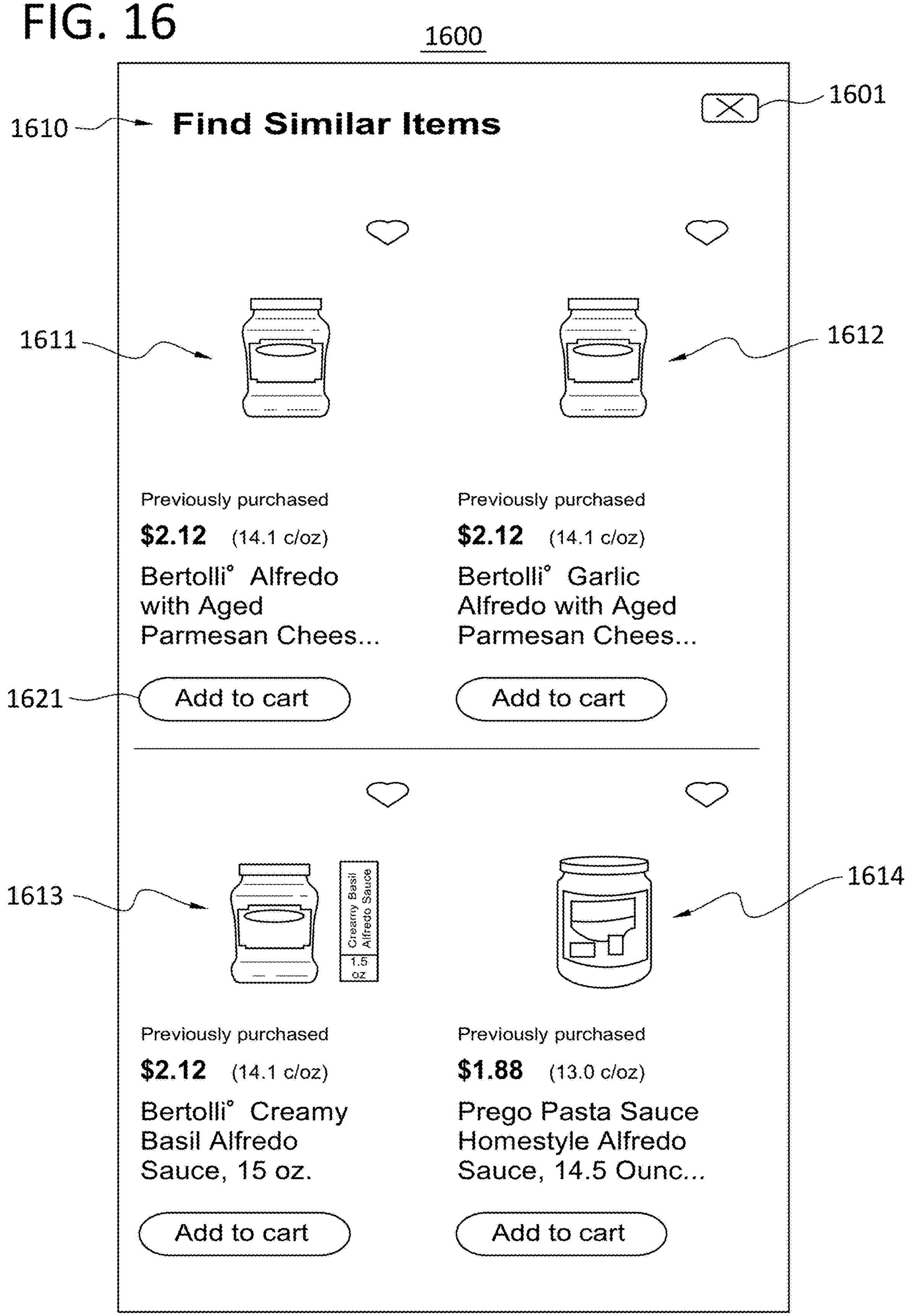
FIG. 16 illustrates an exemplary user interface display showing a similar items page.

Turning ahead in the drawings, FIG. 16 illustrates an exemplary user interface display 1600 showing a similar items page. In a number of embodiments, the similar items page can be a page that shows items that are similar to an item, such as an out-of-stock item. User interface display 1600 is merely exemplary, and embodiments of the user interface can be employed in many different embodiments or examples not specifically depicted or described herein.

In some embodiments, user interface display 1600 can include a title bar 1610 (e.g., "Find Similar Items"), and items, such as items 1611-1614. In many embodiments, items 1611-1614 can be items that are similar to out-of-stock item 1510 (FIG. 15), such as similar pasta sauces. In a number of embodiments, the similar items listed, such as items 1611-1614, can be items that are in-stock and are available to be added to the cart. In many embodiments, the user can add one or more of the similar items, such as items 1611-1614, to the cart using an add-to-cart button, such as add-to-cart button 1621 for item 1611. Add-to-cart button 1621 can be similar or identical to add-to-cart button 1522 (FIG. 15). Once the user has finished adding one or more similar items and/or viewing the similar items page, the user can select a close button 1601 to close the page and return to the reorder page, such as to user interface display 1400 (FIG. 14) and/or user interface display 1500 (FIG. 15).

In a number of embodiments, the techniques described herein can solve a technical problem that arises only within the realm of computer networks, as online orders do not exist outside the realm of computer networks. Generally, an average time a user spends online building a basket (e.g., virtual cart) to complete an online order can take thirty (30) to fifty (50) minutes due to the time-consuming task of selecting items on several different webpages and the computer resources used to navigate (e.g., search) several pages during a visit to a website, which could include, for example, navigating several hundred pages per visit. For example, if a user adds forty-five (45) items in a basket during an online session, that user can browse many more pages exceeding the actual number of items added to a basket. During each visit to a website for a single online session, testing has indicated that a user often selects more than half of the items previously ordered and/or regularly ordered in a basket. Previously ordered items can include items with expiration dates or consumption dates (e.g., fruit and other perishable food items, toiletries, cleaning products, and other such suitable item regularly ordered) that are personalized to that user. Additionally, a user often adds new items to a basket, which can involve further computer resources to continue browsing multiple webpages and selecting each new item to add to the order. By using a single-select predictive platform model, a system can effectively predict a number of reorder items the user can select with a single option (e.g., click) which can beneficially result in a reduction in processor use and memory cache, among other things. By using item grouping, group personalization, group ranking, and/or limiting the number of items within groups, items can be efficiently presented to the user.

Moreover, the techniques described herein can solve a technical problem that cannot be solved outside the context of computer networks. Specifically, the techniques described herein cannot be used outside the context of computer networks, in view of a lack of data, and because the machine learning model cannot be performed without a computer.

In many embodiments, the techniques described herein can provide a practical application and several technological improvements. In some embodiments, the techniques described herein can provide an automatic determination of a set of items by using a predictive model approach focusing on a propensity of a user to regularly reorder based on at least a machine learning approach. These techniques described herein can provide a significant improvement over conventional approaches of subjectively searching for the same items to reorder that can expend a lot of time and computer resources, processors, and memory, to find each previously ordered item in a website (e.g., content catalog of webpages).

In many embodiments, the machine learning model can be pre-trained, but can also consider both historical and dynamic input from each basket completed during a session together with current data for each item previously ordered (e.g., items that are consumed within a number of days that are reordered after consumption). In several embodiments, the technique described herein can allow a machine learning technique to train itself to learn with each iteration. In some embodiments, the techniques described herein can beneficially make determinations based on dynamic information that describes the propensity of a user to regularly reorder over half of the items in a cart (e.g., a basket) during a visit on a given time and day.

In a number of embodiments, the techniques described herein can advantageously provide a consistent user experience by adapting to a constantly changing website that adds new items to website inventory (e.g., online catalogs) of which less than half of the basket can be newly added inventory. Further the techniques described herein can advantageously enable real-time data processing and increase the capability to select a list of items to recommend to a user each time the user builds a basket in real-time.

In many embodiments, the techniques described herein can be used regularly (e.g., hourly, daily, etc.) at a scale that cannot be handled using manual techniques. For example, the system tracks every item ordered for each of a number of users that can result in a number of individual daily visits to the website that can exceed one hundred million, and the number of registered users to the website can exceed ten million.

Various embodiments can include a system including one or more processors and one or more non-transitory computer-readable media storing computing instructions configured to run on the one or more processors and perform certain acts. The acts can include determining a set of items to recommend to a user based on a probability exceeding a predetermined threshold that the user will reorder each item of the set of items at a present time. The probability can be determined based at least in part on previous transactions of the user and other users within a first period of time. The set of items can include at least a predetermined number of items. The acts also can perform sending instructions to display the set of items to the user on a user interface. At least a portion of the set of items is shown as selected on the user interface. The user interface can include a single-click option to add to a cart all selected items of the set of items. The acts further can include receiving a selection of the single-click option to add to the cart the all selected items of the set of items. After receiving the single-click option, the acts additionally can include adding the all selected items of the set of items to the cart.

A number of embodiments can include a method. The method can be implemented via execution of computing instructions configured to run at one or more processors and stored at one or more non-transitory computer-readable media. The method can include determining a set of items to recommend to a user based on a probability exceeding a predetermined threshold that the user will reorder each item of the set of items at a present time. The probability can be determined based at least in part on previous transactions of the user and other users within a first period of time. The set of items can include at least a predetermined number of items. The method also can include sending instructions to display the set of items to the user on a user interface. At least a portion of the set of items is shown as selected on the user interface. The user interface can include a single-click option to add to a cart all selected items of the set of items. The method further can include receiving a selection of the single-click option to add to the cart the all selected items of the set of items. After receiving the single-click option, the method additionally can include adding the all selected items of the set of items to the cart.

Additional embodiments include a system including one or more processors and one or more non-transitory computer-readable media storing computing instructions that, when executed on the one or more processors, perform certain acts. The acts can include obtaining reorder likelihood scores for items that a user has ordered historically. The acts also can include grouping the items into groups using a taxonomy. The acts additionally can include adjusting the groups based on a respective number of items in each of the groups and a respective group-specific threshold for each of the groups. The acts further can include ranking the items within the groups based on the reorder likelihood scores.

Further embodiments include a method implemented via execution of computing instructions configured to run at one or more processors. The method can include obtaining reorder likelihood scores for items that a user has ordered historically. The method also can include grouping the items into groups using a taxonomy. The method additionally can include adjusting the groups based on a respective number of items in each of the groups and a respective group-specific threshold for each of the groups. The method further can include ranking the items within the groups based on the reorder likelihood scores.

Although the single-select predictive platform model and automatic item grouping and personalized department layout for reorder recommendations have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-17 may be modified, and that the foregoing discussion of certain of these embodiments does not necessarily represent a complete description of all possible embodiments. For example, one or more of the procedures, processes, or activities of FIGS. 4, 6, and/or 17 may include different procedures, processes, and/or activities and be performed by many different modules, in many different orders, and/or one or more of the procedures, processes, or activities of FIGS. 4, 6, and/or 17 may include one or more of the procedures, processes, or activities of another different one of FIGS. 4, 6, and/or 17. As another example, the systems within recommendation server 310, web server 320, and/or physical stores system 325 (see FIG. 5) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:

one or more processors; and one or more non-transitory computer-readable media storing computing instructions that, when executed on the one or more processors, perform:

obtaining reorder likelihood scores for items that a user has ordered historically;

grouping the items into groups using a taxonomy;

adjusting the groups based on a respective number of items in each of the groups and a respective group-specific threshold for each of the groups, wherein adjusting the groups comprises at least one of splitting one or more of the groups or merging two or more of the groups;

ranking the items within the groups based on the reorder likelihood scores; and automatically generating, using a random forests machine-learning model and based on a plurality of features, predictions of a respective number of items that the user is likely to reorder in each of the groups.

2. The system of claim 1, wherein adjusting the groups comprises:

splitting the one or more of the groups based on the respective number of items in each of the groups and the respective group-specific threshold for each of the groups.

3. The system of claim 1, wherein adjusting the groups comprises:

merging the two or more of the groups based on the respective number of items in each of the groups and the respective group-specific threshold for each of the groups.

4. The system of claim 1, wherein the items that the user has ordered historically that are included in the groups have reorder likelihood scores above a predetermined threshold.

5. The system of claim 1, wherein:

the random forests machine-learning model comprises an ensemble of automatically trained decision trees.

6. The system of claim 5, wherein:

the predictions generated by the automatically trained decision trees are averaged for each of the groups.

7. The system of claim 1, wherein the plurality of features comprise one or more of a number of orders, a recency of orders, a monetary value at a user level, a monetary value at a department level, reorder rates, similar item orders, or basket sizes.

8. The system of claim 1, wherein the computing instructions, when executed on the one or more processors, further perform:

ranking the groups based on the respective number of items the user is likely to reorder in each of the groups.

9. The system of claim 8, wherein the computing instructions, when executed on the one or more processors, further perform:

transmitting for display to the user a user interface comprising the groups of the items, wherein:

the groups are ordered in the user interface based on the ranking of the groups;

the items are ordered within the groups based on the ranking of the items within the groups; and a respective number of items displayed within each of the groups is limited based on the respective number of items that the user is likely to reorder in each of the groups.

10. The system of claim 9, wherein the user interface further comprises alternatives for out-of-stock items.

11. A method implemented via execution of computing instructions configured to run at one or more processors, the method comprising:

obtaining reorder likelihood scores for items that a user has ordered historically;

grouping the items into groups using a taxonomy;

adjusting the groups based on a respective number of items in each of the groups and a respective group-specific threshold for each of the groups, wherein adjusting the groups comprises at least one of splitting one or more of the groups or merging two or more of the groups;

ranking the items within the groups based on the reorder likelihood scores; and automatically generating, using a random forests machine-learning model and based on a plurality of features, predictions of a respective number of items that the user is likely to reorder in each of the groups.

12. The method of claim 11, wherein adjusting the groups comprises:

splitting the one or more of the groups based on the respective number of items in each of the groups and the respective group-specific threshold for each of the groups.

13. The method of claim 11, wherein adjusting the groups comprises:

merging the two or more of the groups based on the respective number of items in each of the groups and the respective group-specific threshold for each of the groups.

14. The method of claim 11, wherein the items that the user has ordered historically that are included in the groups have reorder likelihood scores above a predetermined threshold.

15. The method of claim 11, wherein:

the random forests machine-learning model comprises an ensemble of automatically trained decision trees.

16. The method of claim 15, wherein:

the predictions generated by the automatically trained decision trees are averaged for each of the groups.

17. The method of claim 11, wherein the plurality of features comprise one or more of a number of orders, a recency of orders, a monetary value at a user level, a monetary value at a department level, reorder rates, similar item orders, or basket sizes.

18. The method of claim 11 further comprising:

ranking the groups based on the respective number of items the user is likely to reorder in each of the groups.

19. The method of claim 18 further comprising:

transmitting for display to the user a user interface comprising the groups of the items, wherein:

the groups are ordered in the user interface based on the ranking of the groups;

the items are ordered within the groups based on the ranking of the items within the groups; and a respective number of items displayed within each of the groups is limited based on the respective number of items that the user is likely to reorder in each of the groups.

20. The method of claim 19, wherein the user interface further comprises alternatives for out-of-stock items.

* * * * *